(12) United States Patent
He et al.

(10) Patent No.: US 11,321,739 B2
(45) Date of Patent: May 3, 2022

(54) MOBILE ADVERTISEMENT SYSTEMS AND MOBILE ADVERTISEMENT PLATFORMS USING THE SAME

(71) Applicants: David Quan He, Johns Creek, GA (US); Ming Jiang, Alpharetta, GA (US)

(72) Inventors: David Quan He, Johns Creek, GA (US); Ming Jiang, Alpharetta, GA (US)

( * ) Notice: Subject to any disclaimer, the term of this patent is extended or adjusted under 35 U.S.C. 154(b) by 0 days.

(21) Appl. No.: 17/174,361

(22) Filed: Feb. 12, 2021

(65) Prior Publication Data

US 2021/0166276 A1 Jun. 3, 2021

Related U.S. Application Data

(63) Continuation-in-part of application No. 15/702,701, filed on Sep. 12, 2017, now abandoned.

(51) Int. Cl.
*G06Q 30/00* (2012.01)
*G06Q 30/02* (2012.01)
*G06V 20/56* (2022.01)

(52) U.S. Cl.
CPC ..... *G06Q 30/0266* (2013.01); *G06Q 30/0261* (2013.01); *G06Q 30/0264* (2013.01); *G06V 20/56* (2022.01)

(58) Field of Classification Search
None
See application file for complete search history.

(56) References Cited

U.S. PATENT DOCUMENTS

| | | | | |
|---|---|---|---|---|
| 9,307,131 | B1 * | 4/2016 | Breen | G06F 1/1635 |
| 10,665,155 | B1 * | 5/2020 | Rao | G06Q 30/0242 |
| 2005/0083183 | A1 * | 4/2005 | Cao | B60Q 1/503 |
| | | | | 340/426.13 |
| 2019/0080355 | A1 * | 3/2019 | Jiang | G06Q 30/0267 |
| 2020/0269776 | A1 * | 8/2020 | Batten | G09G 5/00 |

* cited by examiner

*Primary Examiner* — Meredith A Long
(74) *Attorney, Agent, or Firm* — Ming Jiang; MM IP Services LLC

(57) ABSTRACT

A mobile advertisement system mounted on a back window of a vehicle using suction cups is presented according to aspects of present disclosure. In certain embodiments, the mobile advertisement system connects wirelessly to a mobile advertisement server, sends its GPS location updates periodically to mobile advertisement server, receives advertisements and delivery instructions from mobile advertisement server in response to the GPS location updates sent, displays advertisements on the display screen of the mobile advertisement system according to the corresponding delivery instructions when at least one automobile is detected, and transmits delivery confirmations to mobile advertisement server after each advertisement is displayed according to the corresponding delivery instructions. A video camera detects whether there are any automobile behind, and mobile advertisement system will not display advertisements when there is no automobile behind. brightness of advertisement display is in directly proportional to light intensity outside detected by a light sensor.

14 Claims, 12 Drawing Sheets

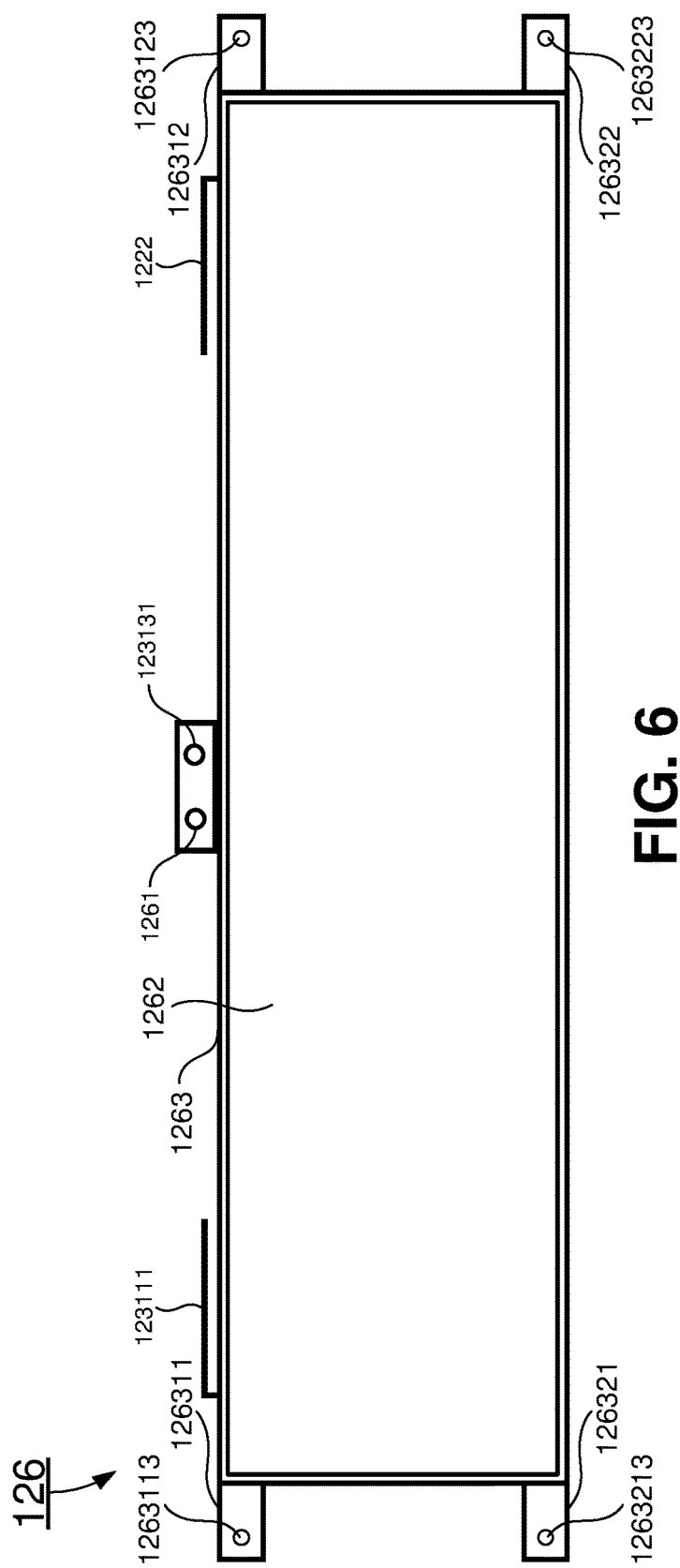
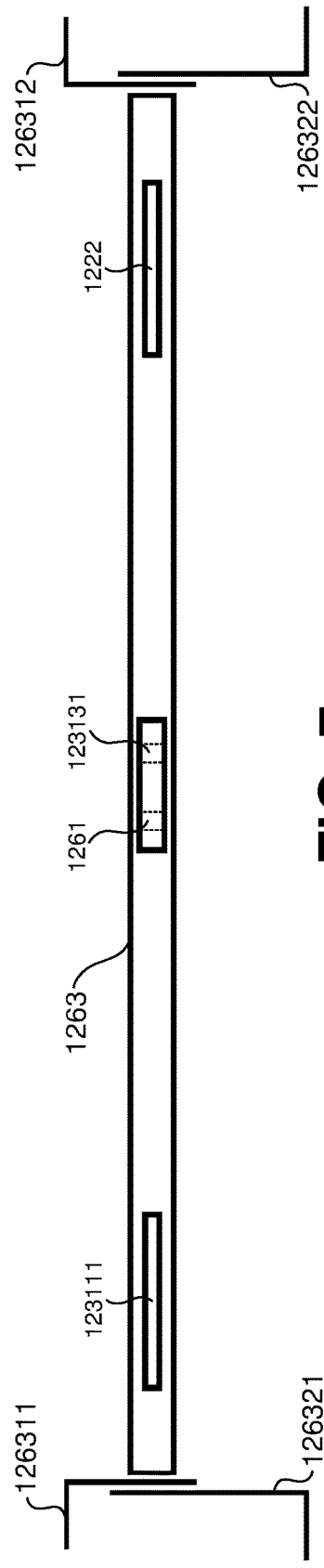

MOBILE ADVERTISEMENT SYSTEMS AND MOBILE ADVERTISEMENT PLATFORMS USING THE SAME

The present disclosure generally relates to advertisement, and more particularly to mobile advertisement systems and a mobile advertisement platform using the mobile advertisement systems.

BACKGROUND

Typical commercial information display includes displays of various type of advertisements. Such advertisements can be seen on billboards along roadsides, posters displayed in store fronts, or sometimes carried on moving vehicles. Most of these advertisements have fixed contents, and are displayed in fixed locations. Therefore, conventional advertisement is limited by the fixed contents and/or fixed location.

Therefore, an unaddressed need exists in the art to address the aforementioned deficiencies and inadequacies.

SUMMARY

In one aspect, the present disclosure relates to a mobile advertisement system. In certain embodiments, the mobile advertisement system is installed on a back window of a vehicle. The mobile advertisement system includes: a processor, a network interface controller, an USB interface connected to an USB interface connector, a power module connected to a power supply of a vehicle, a display screen having a light sensor, and a non-volatile memory. The non-volatile memory includes a local data storage and computer executable instructions. In certain embodiments, the computer executable instructions include: a GPS module, a network communication module, a mobile advertisement control module, and a mobile advertisement control module.

In certain embodiments, the GPS module receives GPS satellite signal through a GPS antenna to determine the GPS location of the mobile advertisement system. The network communication module communicates with a mobile advertisement server through the network interface controller and a wireless communication antenna over a network. The mobile advertisement control module is connected to a video camera, the video camera is installed on top of the display screen to acquires images from behind of the vehicle and determines whether there are any automobiles and observers behind the vehicle, and when there is no automobile and observer behind the vehicle, the display screen of the mobile advertisement system will temporarily cease operation until at least one automobile is detected. The display output module controls the operation of the advertisement output to the display screen.

In certain embodiments, the mobile advertisement system includes the light sensor. The light sensor is positioned on the display screen facing outside to detect environmental light intensity outside of the vehicle. The detected environmental light intensity outside of the vehicle is transmitted to the display output module. The display output module receives the detected environmental light intensity outside of the vehicle from the light sensor, and controls the display brightness of the display screen in directly proportional to the detected environmental light intensity outside of the vehicle.

In certain embodiments, when executed by the processor, the computer executable instructions cause the processor to:

connect to the mobile advertisement server over the network;

send its GPS location updates in the predetermined interval to the mobile advertisement server;

receive a set of location-based advertisements and delivery instructions from the mobile advertisement server in response to the GPS location updates sent;

display the set of location-based advertisements on the display screen of the mobile advertisement system according to the corresponding delivery instructions when at least one automobile is detected; and transmit delivery confirmations to the mobile advertisement server from the mobile advertisement system after each location-based advertisement is displayed according to the corresponding delivery instructions.

In certain embodiments, the display screen of the mobile advertisement system includes: a light-emitting diode (LED) display panel, and an organic light-emitting diode (OLED) display panel.

In certain embodiments, the mobile advertisement system is installed in a rectangular display screen case. The rectangular display screen case includes: the video camera, the light sensor, the GPS antenna, a wireless communication antenna, and the display panel.

In certain embodiments, the rectangular display screen case is mounted on the back window of the vehicle using four suction cups through four brackets positioned at four corners of the rectangular display screen case. Each of the four brackets is fastened onto the four corners of the rectangular display screen case using two bracket screws through four sets of installation holes. The four sets of installation holes ensure the rectangular display screen case is installed vertically regardless the slope of the back window of the vehicle.

In another aspect, the present disclosure relates to a mobile advertisement platform. In certain embodiments, the mobile advertisement platform includes: a mobile advertisement server, and a group of mobile advertisement systems, each of the group of mobile advertisement systems is installed on a back window of a vehicle, and wirelessly connected to the mobile advertisement server through a network.

In certain embodiments, the mobile advertisement server registers a group of advertisers and a group of subscribers, receives location-based advertisements and their corresponding delivery instructions from the advertisers, receives GPS location updates in a predetermined interval from each of the group of mobile advertisement systems, dispatches the location-based advertisements and the corresponding delivery instructions based on the GPS location updates received to each of the group of mobile advertisement systems through the network, and receives delivery confirmations after each location-based advertisement is displayed according to the corresponding delivery instructions through the network.

In certain embodiments, each of the group of mobile advertisement systems connects to the mobile advertisement server over the network, sends its GPS location updates in the predetermined interval to the mobile advertisement server, receives the location-based advertisements and the delivery instructions from the mobile advertisement server in response to the GPS location updates sent, displays the location-based advertisements on a respective display screen of the mobile advertisement system according to the corresponding delivery instructions when at least one automobile behind is detected, transmits the delivery confirmations to the mobile advertisement server from each of the mobile advertisement systems after each location-based advertisement is displayed according to the corresponding delivery instructions.

In certain embodiments, the location-based advertisements include: a set of banners, a set of digital images, a set of messages in text form, a set of animations, a set of videos, and one or more amber alerts.

In certain embodiments, the delivery confirmation includes: the time of display of each of the location-based advertisements, the location of display of each of the location-based advertisements, total time of display of each of the location-based advertisements, and number of vehicles and observers detected behind the vehicle.

In certain embodiments, each of the group of mobile advertisement systems includes: a processor, a network interface controller, an USB interface connected to an USB interface connector, a power module connected to a power supply of the vehicle, the display screen having a light sensor, and a non-volatile memory. The non-volatile memory includes a local data storage and computer executable instructions. The computer executable instructions include: a GPS module, a network communication module, a mobile advertisement control module, and a display output module. In certain embodiments, the GPS module receives GPS satellite signal through a GPS antenna to determine the GPS location of the mobile advertisement system. The network communication module communicates with the mobile advertisement server through the network interface controller and a wireless communication antenna over the network. The mobile advertisement control module is connected to a video camera. The video camera is installed on top of the display screen to acquires images from behind of the vehicle carrying the mobile advertisement system and determines whether there are any automobiles and observers behind the vehicle. When there is no automobile and observer behind the vehicle, the display screen of the mobile advertisement system will temporarily cease operation until at least one automobile is detected. The display output module controls the operation of the advertisement output to the display screen.

In certain embodiments, the mobile advertisement system includes the light sensor. The light sensor is positioned on the display screen facing outside to detect environmental light intensity outside of the vehicle. The detected environmental light intensity outside of the vehicle is transmitted to the display output module. The display output module receives the detected environmental light intensity outside of the vehicle from the light sensor, and controls the display brightness of the display screen in directly proportional to the detected environmental light intensity outside of the vehicle.

In certain embodiments, when executed by the processor, the computer executable instructions cause the processor to:

retrieve a set of local advertisements and a set of local delivery instructions through the USB interface when the set of local advertisements and the set of local delivery instructions are available;

store the set of local advertisements and the set of local delivery instructions retrieved in the local data storage; and display the set of local advertisements through the display screen according to the set of local delivery instructions when at least one automobile behind is detected.

In certain embodiments, the set of local advertisements includes: a set of banners, a set of digital images, a set of messages in text form, a set of animations, and a set of videos.

In certain embodiments, the display screen of the mobile advertisement system includes: a light-emitting diode (LED) display panel, and an organic light-emitting diode (OLED) display panel.

In certain embodiments, the mobile advertisement system is installed in a rectangular display screen case. The rectangular display screen case includes: the video camera, the light sensor, the GPS antenna, a wireless communication antenna, and the display panel.

In certain embodiments, the rectangular display screen case is mounted on the back window of the vehicle using four suction cups through four brackets positioned at four corners of the rectangular display screen case. Each of the four brackets is fastened onto the four corners of the rectangular display screen case using two bracket screws through four sets of installation holes. The four sets of installation holes ensure the rectangular display screen case is installed vertically regardless the slope of the back window of the vehicle.

These and other aspects of the present disclosure will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment. The drawings do not limit the present disclosure to the specific embodiments disclosed and described herein. The drawings are not necessarily to scale, emphasis instead being placed upon clearly illustrating the principles of the disclosure, and wherein:

FIG. 6 illustrates a front view of a mobile advertisement system according to certain embodiments of the present disclosure;

FIG. 7 illustrates a top view of the mobile advertisement system according to certain embodiments of the present disclosure;

DETAILED DESCRIPTION

Figure 1:
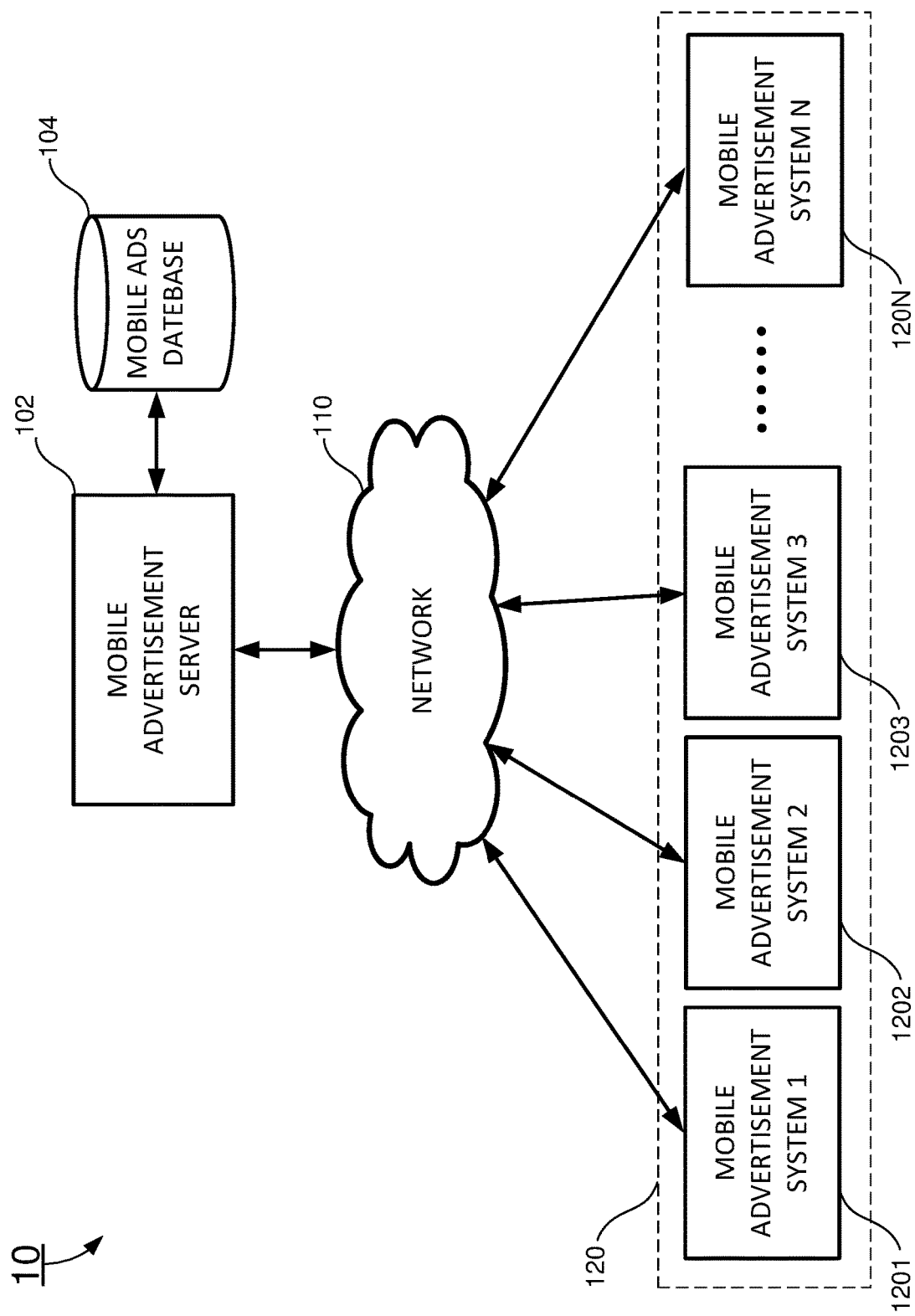
FIG. 1 shows a block diagram of a mobile advertisement platform according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

The description will be made as to the embodiments of the present disclosure in conjunction with the accompanying drawings FIGS. 1 through 15.

Figure 3:
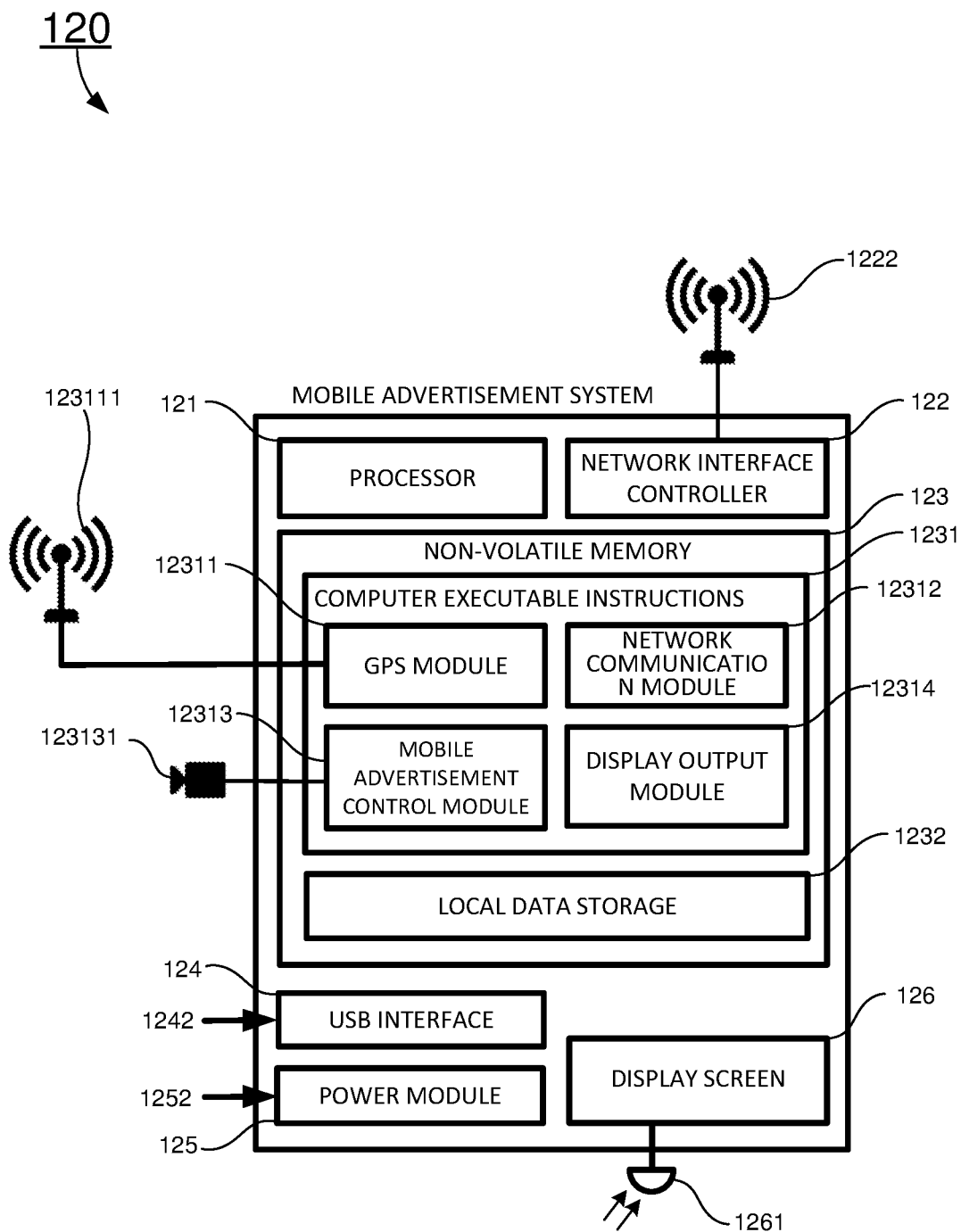
FIG. 3 shows a block diagram of a mobile advertisement system of the mobile advertisement platform according to one embodiment of the present disclosure.

Referring now to FIG. 3, a block diagram of a mobile advertisement system 120 of the mobile advertisement platform 10 is shown according to certain embodiments of the present disclosure. In certain embodiments, the mobile advertisement system 120 includes: a processor 121, a network interface controller 122, an USB interface 124 connected to a USB interface connector 1242, a power module 125 connected to a power supply of the vehicle, a display screen 126 having a light sensor 1261, and a non-volatile memory 123. The non-volatile memory 123 includes a local data storage 1232 and computer executable instructions 1231. In certain embodiments, the computer executable instructions 1231 includes: a GPS module 12311, a network communication module 12312, a mobile advertisement control module 12313, and a mobile advertisement control module 12313.

In certain embodiments, the GPS module 12311 receives GPS satellite signal through a GPS antenna 123111 to determine the GPS location of the mobile advertisement system 120. The network communication module 12312 communicates with a mobile advertisement server 102 through the network interface controller 122 and a wireless communication antenna 1222 over a network 110. The mobile advertisement control module 12313 is connected to a video camera 123131, the video camera 123131 is installed on top of the display screen 126 to acquires images from behind of the vehicle and determines whether there are any automobiles and observers behind the vehicle, and when there is no automobile and observer behind the vehicle, the display screen 126 of the mobile advertisement system 120 will temporarily cease operation until at least one automobile is detected. The display output module 12314 controls the operation of the advertisement output to the display screen 126.

In certain embodiments, the mobile advertisement system 120 includes the light sensor 1261. The light sensor 1261 is positioned on the display screen 126 facing outside to detect environmental light intensity outside of the vehicle. The detected environmental light intensity outside of the vehicle is transmitted to the display output module 12314. The display output module 12314 receives the detected environmental light intensity outside of the vehicle from the light sensor 1261, and controls the display brightness of the display screen 126 in directly proportional to the detected environmental light intensity outside of the vehicle.

In certain embodiments, when executed by the processor 121, the computer executable instructions 1231 cause the processor 121 to:

connect to the mobile advertisement server 102 over the network 110;

send its GPS location updates in the predetermined interval to the mobile advertisement server 102;

receive a set of location-based advertisements and delivery instructions from the mobile advertisement server 102 in response to the GPS location updates sent;

display the set of location-based advertisements on the display screen 126 of the mobile advertisement system 120 according to the corresponding delivery instructions when at least one automobile behind is detected; and transmit delivery confirmations to the mobile advertisement server 102 from the mobile advertisement system 120 after each location-based advertisement is displayed according to the corresponding delivery instructions.

Figure 5:
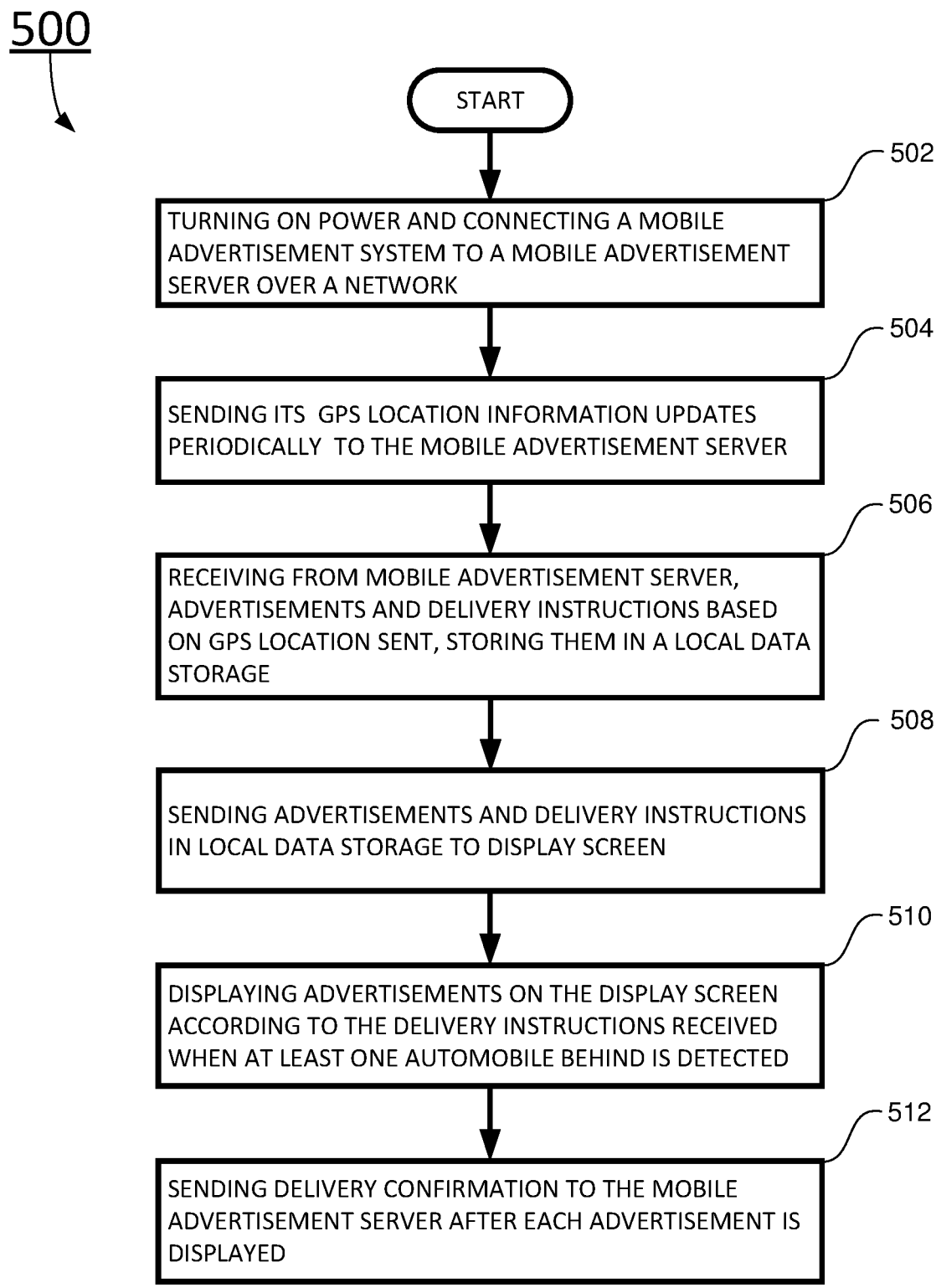
FIG. 5 shows a flow chart of a method of using the mobile advertisement system of the mobile advertisement platform according to certain embodiments of the present disclosure.

In certain embodiments, a flow chart of a method 500 of using a mobile advertisement system of the mobile advertisement platform is shown in FIG. 5 according to certain embodiments of the present disclosure.

At block 502, a mobile advertisement system 120 is connected to a power outlet of a vehicle through a power input 1252 by a user, the mobile advertisement system 120 is turned on by the user, and the mobile advertisement system 120 establishes network communication through a network interface controller 1222 and a network communication module 12312 of the mobile advertisement system 120 between the mobile advertisement system 120 to a mobile advertisement server 102 of a mobile advertisement platform 10 over a network 110.

The mobile advertisement system 120 includes a power module 1252. The power module 1252 indicates the mobile advertisement system 120 is powered on when a power input 1252 is connected to and switched on to a power supply. The power input 1252 may include a regular 120V alternate current (AC) power supply, or a 12 V direct current (DC) power supply as often available on automobiles.

At block 504, the mobile advertisement system 120 sends GPS location updates of the mobile advertisement system 120 to the mobile advertisement server 102 in a predetermined interval over the network 110. In certain embodiments, the mobile advertisement system 120 may send out GPS location updates to the mobile advertisement server 102 at any time. In one embodiment, the mobile advertisement system 120 may send out GPS location updates when the vehicle carrying the mobile advertisement system 120 moves away from the current GPS location a predetermined distance, for example, a mile, or three miles.

At block 506, the mobile advertisement system 120 receives one or more location-based advertisements and corresponding delivery instructions from the mobile advertisement server 102 in response to the GPS location updates sent over the network 110. After the mobile advertisement system 120 receives the location-based advertisements and corresponding delivery instructions, these location-based advertisements and corresponding delivery instructions are stored in a local data storage 1232 of the mobile advertisement system 120.

In one embodiment, the mobile advertisement server 102 dispatches the location-based advertisements and the delivery instructions to the mobile advertisement system 120 only when the mobile advertisement system 120 moves away from the current GPS location a predetermined distance, for example, a mile, or three miles. In another embodiment, the mobile advertisement server 102 dispatches the location-based advertisements and the delivery instructions to the mobile advertisement system 120 only when the mobile advertisement server 102 receives one or more new location-based advertisements to be delivered in or around the current GPS location.

At block 508, the mobile advertisement server 102 sends the location-based advertisements and the delivery instructions received to a display screen 126 through a display output module 12314 of the mobile advertisement system 120 for display. In certain embodiments, each of the location-based advertisements includes: one or more banners, one or more digital images one or more messages in text form one or more animations, and one or more videos. Each of the delivery instructions corresponds to one of the location-based advertisements. Each of the delivery instructions includes: an advertisement delivery time period and an advertisement delivery location information.

At block 510, the mobile advertisement system 120 includes a video monitor 123131, and the video camera 123131 is connected to a mobile advertisement control module 12313. The video camera 123131 is installed on top of the display screen 126 to acquires images from behind of the vehicle and determines whether there are any automobiles and observers behind the vehicle. When there is no automobile and observer behind the vehicle, the display screen 126 of the mobile advertisement system 120 will temporarily cease operation until at least one automobile is detected. When the video camera 123131 detects at least one automobile behind, the mobile advertisement system 120 displays the location-based advertisements on the display screen 126 according to the delivery instructions. The mobile advertisement system 120 displays the location-based advertisements on the display screen 126 when the mobile advertisement system 120 is positioned in the region specified by the advertisement delivery location information and during the advertisement delivery time period.

At block 512, The mobile advertisement system 120 sends a delivery confirmation for each of the location-based advertisements displayed through the mobile advertisement system 120 back to the mobile advertisement server 102 over the network 110. The delivery confirmation includes at least: the time of display of each of the location-based advertisements, the location of display of each of the location-based advertisements, total time of display of each of the location-based advertisements, and number of vehicles and observers detected behind the vehicle. In one embodiment, the delivery confirmation may be used to account for the final results of the advertisements delivered so the mobile advertisement platform 10 may use the delivery confirmation to charge the advertisers. The received delivery confirmations are stored in a secure mobile advertisement database 104 and the data storage 10262 of the mobile advertisement server 102.

In certain embodiments, the method 500 may also include: retrieving one or more local advertisements and corresponding local delivery instructions from a USB interface when the local advertisements and the local delivery instructions are available, storing the local advertisements and the local delivery instructions retrieved in the local data storage, and displaying the local advertisements on the mobile advertisement display system 128 according to the local delivery instructions.

In certain embodiments, each of the local advertisements includes: one or more banners, one or more digital images one or more messages in text form one or more animations, and one or more videos. Each of the local delivery instructions corresponds to one of the local advertisements. Each of the local delivery instructions includes: a local advertisement delivery time period and a local advertisement delivery location information. The mobile advertisement system 120 displays the local advertisements when the mobile advertisement system 120 is positioned in the region specified by the local advertisement delivery location information and during the local advertisement delivery time period.

In certain embodiments, the mobile advertisement system 120 is used for a revenue sharing mobile advertisement platform. In order to be easily accepted by any drivers of automobiles, it is required to be in light weight, small and thin in constructions, and can be installed without permanent damages to the automobile where the mobile advertisement system 120 is installed.

In certain embodiments, the display screen 126 of the mobile advertisement system 120 includes: a light-emitting diode (LED) display panel 1262, and an organic light-emitting diode (OLED) display panel 1262.

In certain embodiments, as shown in FIG. 6 and FIG. 7, the mobile advertisement system 120 is installed in a rectangular display screen case 1263. The rectangular display screen case 1263 includes: the video camera 123131, the light sensor 1261, the GPS antenna 123111, a wireless communication antenna 1222, and the display panel 1262. The display panel 1262 faces outside through a back window 200 of the vehicle. The video camera 123131 also faces outside of the vehicle to detect any automobiles and any observers behind the vehicle. The light sensor 1261 also faces outside to detect environmental light intensity outside of the vehicle. As shown in FIG. 6 and FIG. 7, the GPS antenna 123111 and the wireless communication antenna 1222 are placed on a top edge of the mobile advertisement system 120 to have best reception of wireless communication signals and GPS signals.

In a preferred embodiment, as shown in FIGS. 6-15, the rectangular display screen case 1263 has four corners: an upper left corner, an upper right corner, a lower left corner, and a lower right corner. In each of these four corners, there is a corresponding bracket: an upper left bracket 126311 at the upper left corner, an upper right bracket 126312 at the upper right corner, a lower left bracket 126321 at the lower left corner, and a lower right bracket 126322 at the lower right corner.

Figure 8:
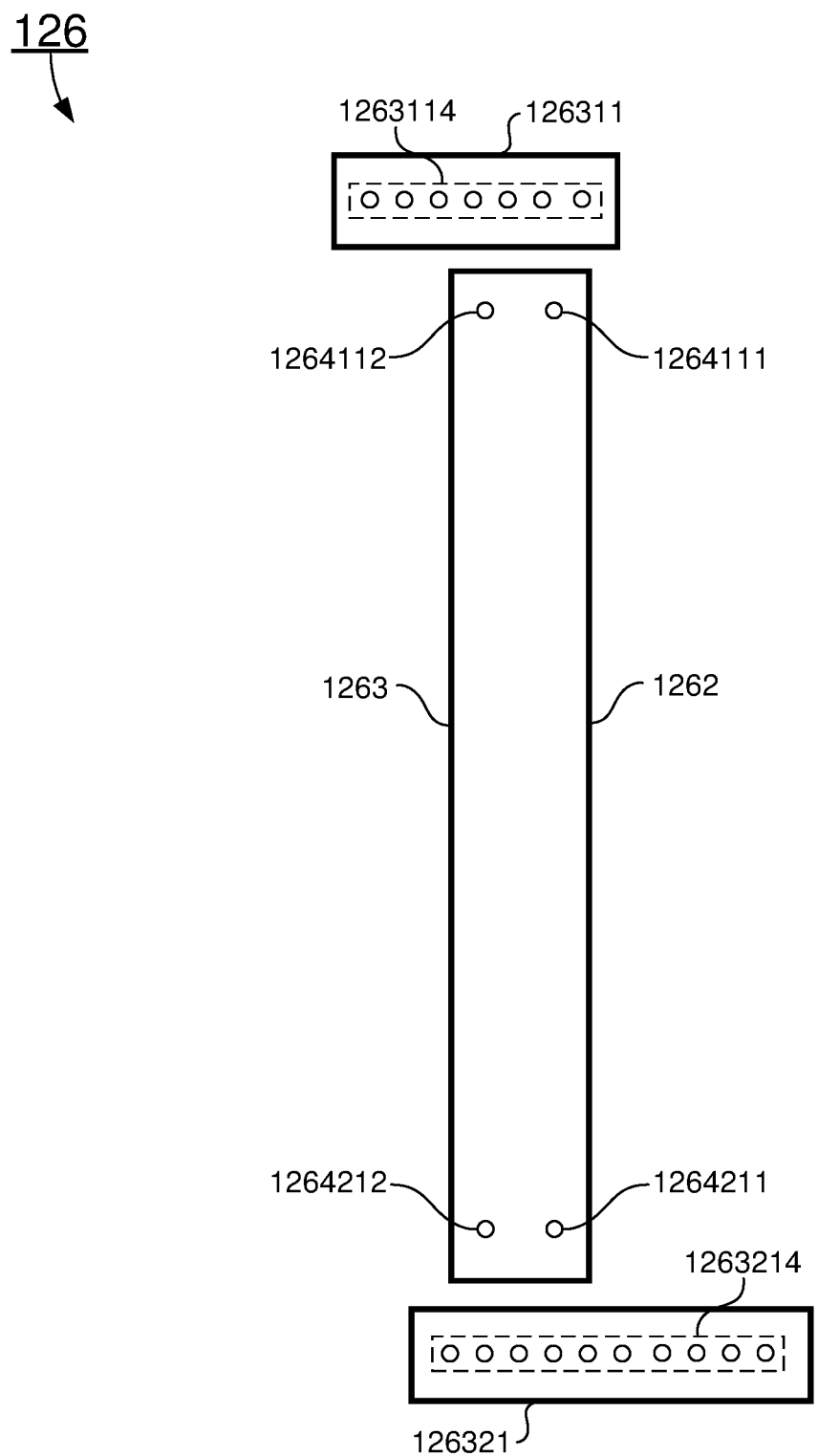
FIG. 8 illustrates a left side view of the mobile advertisement system with a upper left bracket and a lower left bracket detached from a rectangular display screen case according to certain embodiments of the present disclosure.

In certain embodiments, a left side view of the mobile advertisement system 120 is shown in FIG. 8. The left side of the mobile advertisement system 120 includes a first upper left bracket installation hole 1264111, a second upper left bracket installation hole 1264112 for fastening the upper left bracket 126311, a first lower left bracket installation hole 1264211, a second lower left bracket installation hole 1264212 for fastening the lower left bracket 126321. The upper left bracket 126311 includes a set of upper left bracket holes 1263114 and the lower left bracket 126321 includes a set of lower left bracket holes 1263214. The set of upper left bracket holes 1263114 allows a distance between a top of the mobile advertisement system 120 and the back window 200 of the vehicle to be adjusted. The set of lower left bracket holes 1263214 allows a distance between a bottom of the mobile advertisement system 120 and the back window 200 of the vehicle to be adjusted. The upper left bracket 126311 can be slid from the left to right against the first upper left bracket installation hole 1264111 and the second upper left bracket installation hole 1264112 to adjust the distance between the top of the mobile advertisement system 120 and the back window 200 of the vehicle. The lower left bracket 126321 can be slid from the left to right against the first lower left bracket installation hole 1264211 and the second lower left bracket installation hole 1264212 to adjust the distance between the bottom of the mobile advertisement system 120 and the back window 200 of the vehicle.

Figure 9:
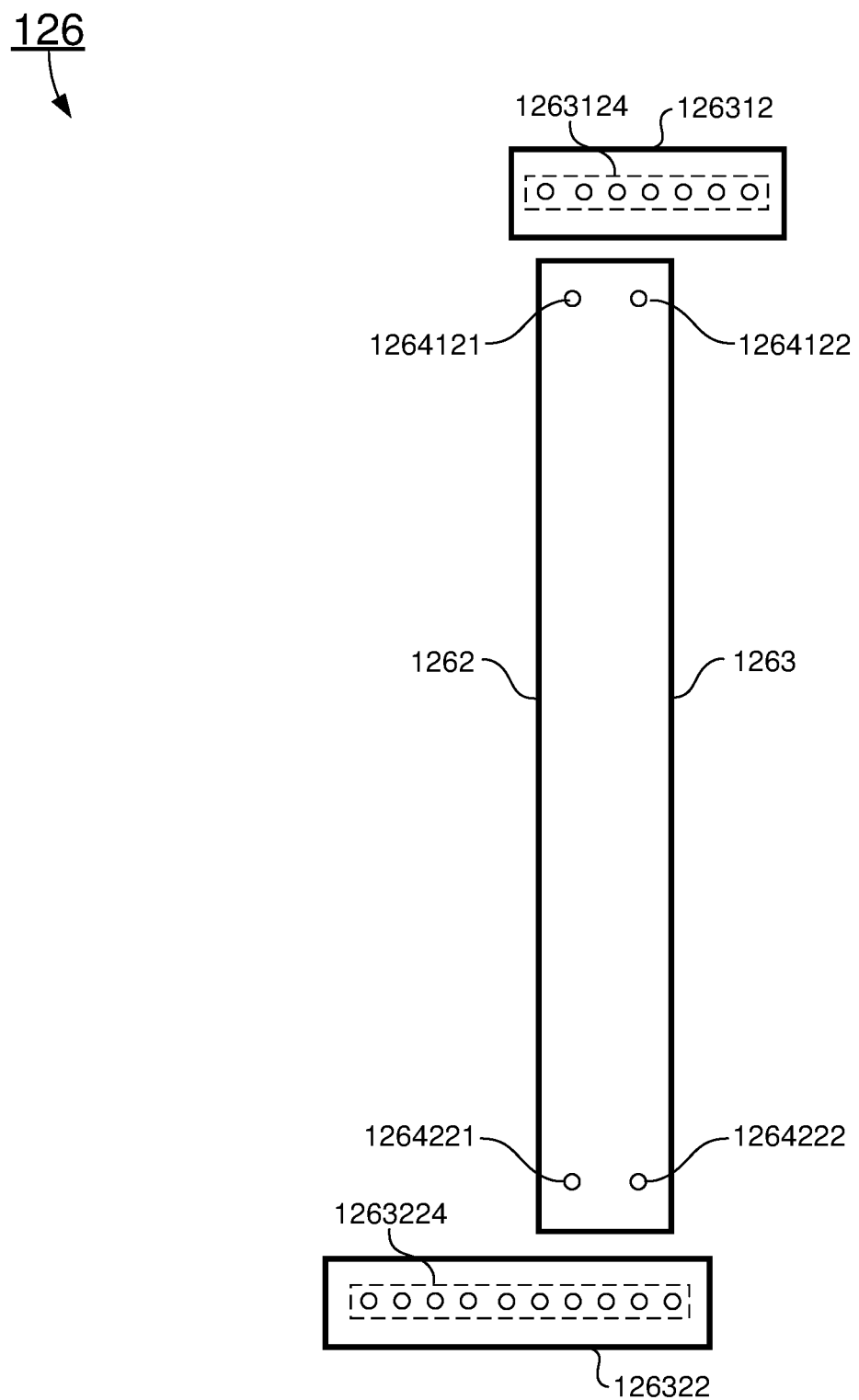
FIG. 9 illustrates a right side view of the mobile advertisement system with a upper right bracket and a lower right bracket detached from the rectangular display screen case according to certain embodiments of the present disclosure.

In certain embodiments, a right side view of the mobile advertisement system 120 is shown in FIG. 9. The right side of the mobile advertisement system 120 includes a first upper right bracket installation hole 1264121, a second upper right bracket installation hole 1264122 for fastening the upper right bracket 126312, a first lower right bracket installation hole 1264221, a second lower right bracket installation hole 1264222 for fastening the lower right bracket 126322. The upper right bracket 126312 includes a set of upper right bracket holes 1263124 and the lower right bracket 126322 includes a set of lower right bracket holes 1263224. The set of upper right bracket holes 1263124 allows a distance between the top of the mobile advertisement system 120 and the back window 200 of the vehicle to be adjusted. The set of lower right bracket holes 1263214 allows a distance between the bottom of the mobile advertisement system 120 and the back window 200 of the vehicle to be adjusted. The upper right bracket 126312 can be slid from the left to right against the first upper right bracket installation hole 1264121 and the second upper right bracket installation hole 1264122 to adjust the distance between the top of the mobile advertisement system 120 and the back window 200 of the vehicle. The lower right bracket 126322 can be slid from the left to right against the first lower right bracket installation hole 1264221 and the second lower right bracket installation hole 1264222 to adjust the distance between the bottom of the mobile advertisement system 120 and the back window 200 of the vehicle.

It is well known that back windows of different vehicle have different slopes. Some of them, such as van and some SUV, are straight up and down. Others shows various angles such as sedans and some sports cars. In order to be able to install in many different vehicles, flexibility of adjustment of the distance between the top end and bottom end of the mobile advertisement system 120 is necessary. Such a flexibility ensures the mobile advertisement system 120 is installed vertically regardless the slop of the back window 200 so that anyone from outside of the vehicle will see the display screen 126 without distortion.

Figure 10:
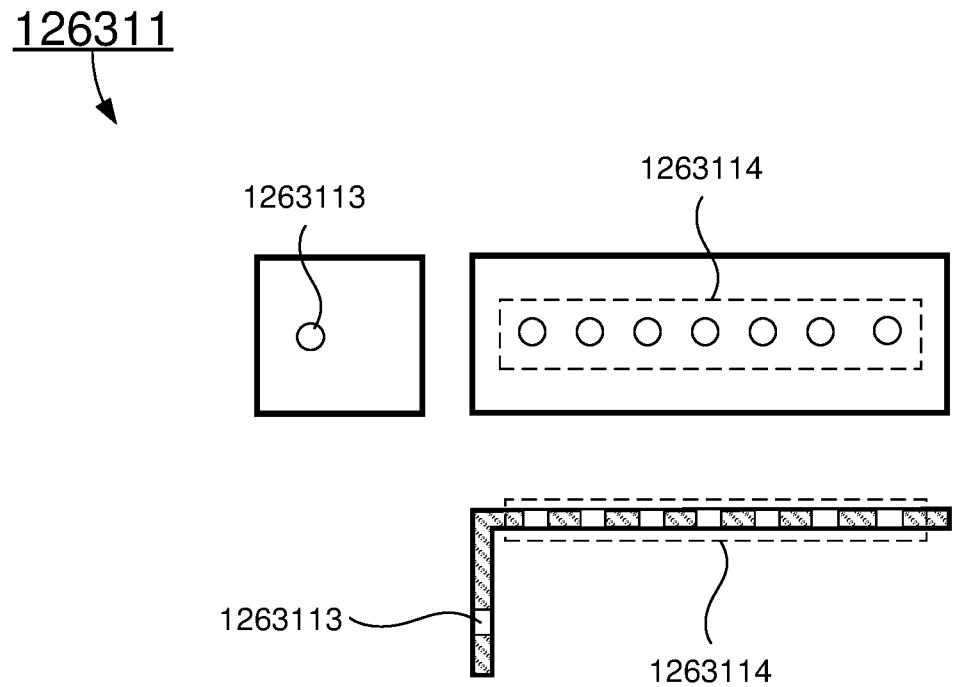
FIG. 10 illustrates a front view, a side view and a top sectional view of the upper left bracket according to certain embodiments of the present disclosure.

Referring now to FIG. 10, a front view, a side view and a top sectional view of the upper left bracket 126311 are shown according to certain embodiments of the present disclosure. The upper left bracket 126311 forms an "L" shape. The shorter end of the "L" includes an upper left bracket suction cup installation hole 1263113 for install an upper left suction cup 211. The longer end of the "L" includes the set of upper left bracket holes 1263114 for fastening the upper left bracket 126311 onto the upper left corner of the mobile advertisement system 120.

Figure 11:
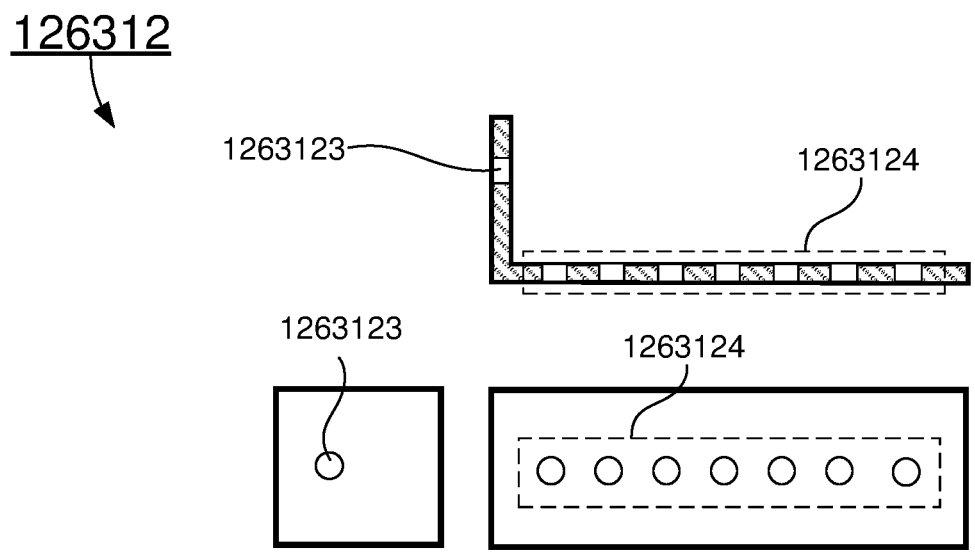
FIG. 11 illustrates a top sectional view, a side view, a front view of the upper right bracket according to certain embodiments of the present disclosure.

Referring now to FIG. 11, a top sectional view, a front view, and a side view of the upper right bracket 126312 are shown according to certain embodiments of the present disclosure. The upper right bracket 126312 forms an "L" shape. The shorter end of the "L" includes an upper right bracket suction cup installation hole 1263123 for install an upper right suction cup 212. The longer end of the "L" includes the set of upper right bracket holes 1263124 for fastening the upper right bracket 126312 onto the upper right corner of the mobile advertisement system 120.

Figure 12:
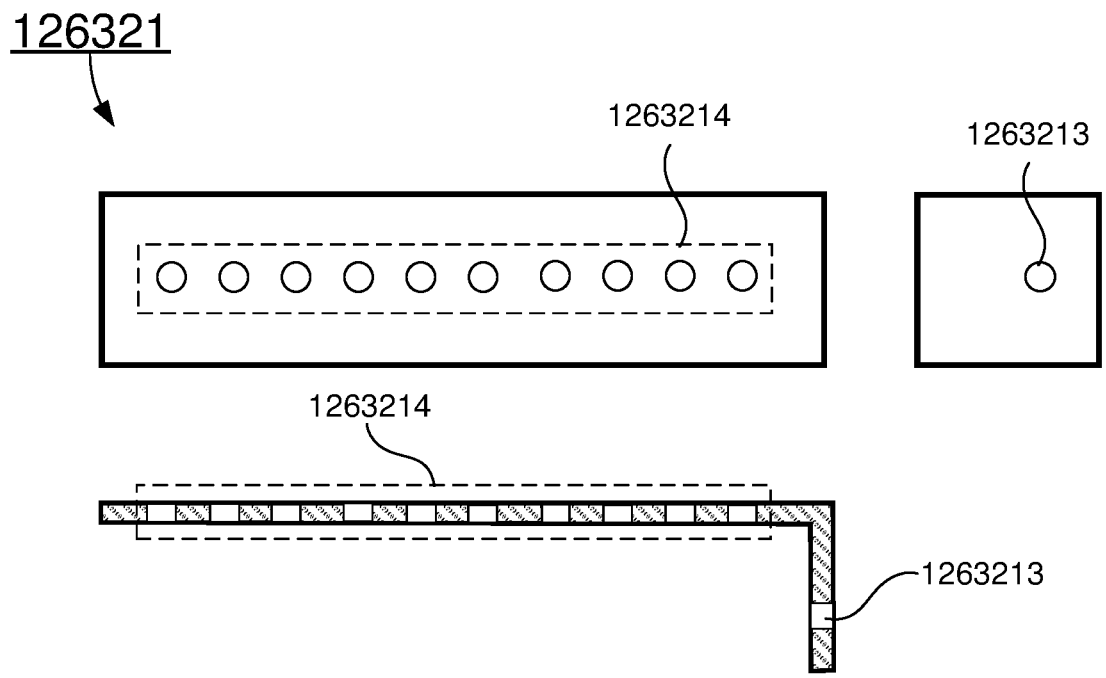
FIG. 12 illustrates a front view, a side view and a top sectional view of the lower left bracket according to certain embodiments of the present disclosure.

Referring now to FIG. 12, a front view, a side view and a top sectional view of the lower left bracket 126321 are shown according to certain embodiments of the present disclosure. The lower left bracket 126321 forms an "L" shape. The shorter end of the "L" includes a lower left bracket suction cup installation hole 1263213 for install a lower left suction cup 221. The longer end of the "L" includes the set of lower left bracket holes 1263214 for fastening the lower left bracket 126321 onto the lower left corner of the mobile advertisement system 120.

Figure 13:
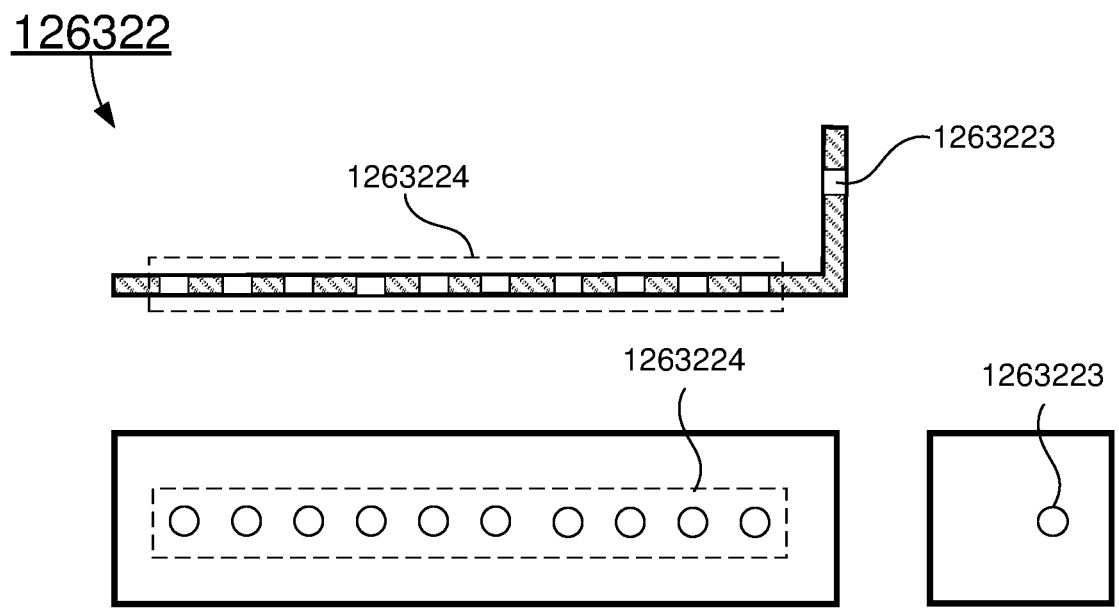
FIG. 13 illustrates a top sectional view, a side view, a front view of the lower right bracket according to certain embodiments of the present disclosure.

Referring now to FIG. 13, a top sectional view, a front view, and a side view of the lower right bracket 126322 according to certain embodiments of the present disclosure. The lower right bracket 126322 forms an "L" shape. The shorter end of the "L" includes a lower right bracket suction cup installation hole 1263223 for install a lower right suction cup 222. The longer end of the "L" includes the set of lower right bracket holes 1263224 for fastening the lower right bracket 126322 onto the lower right corner of the mobile advertisement system 120.

Figure 14:
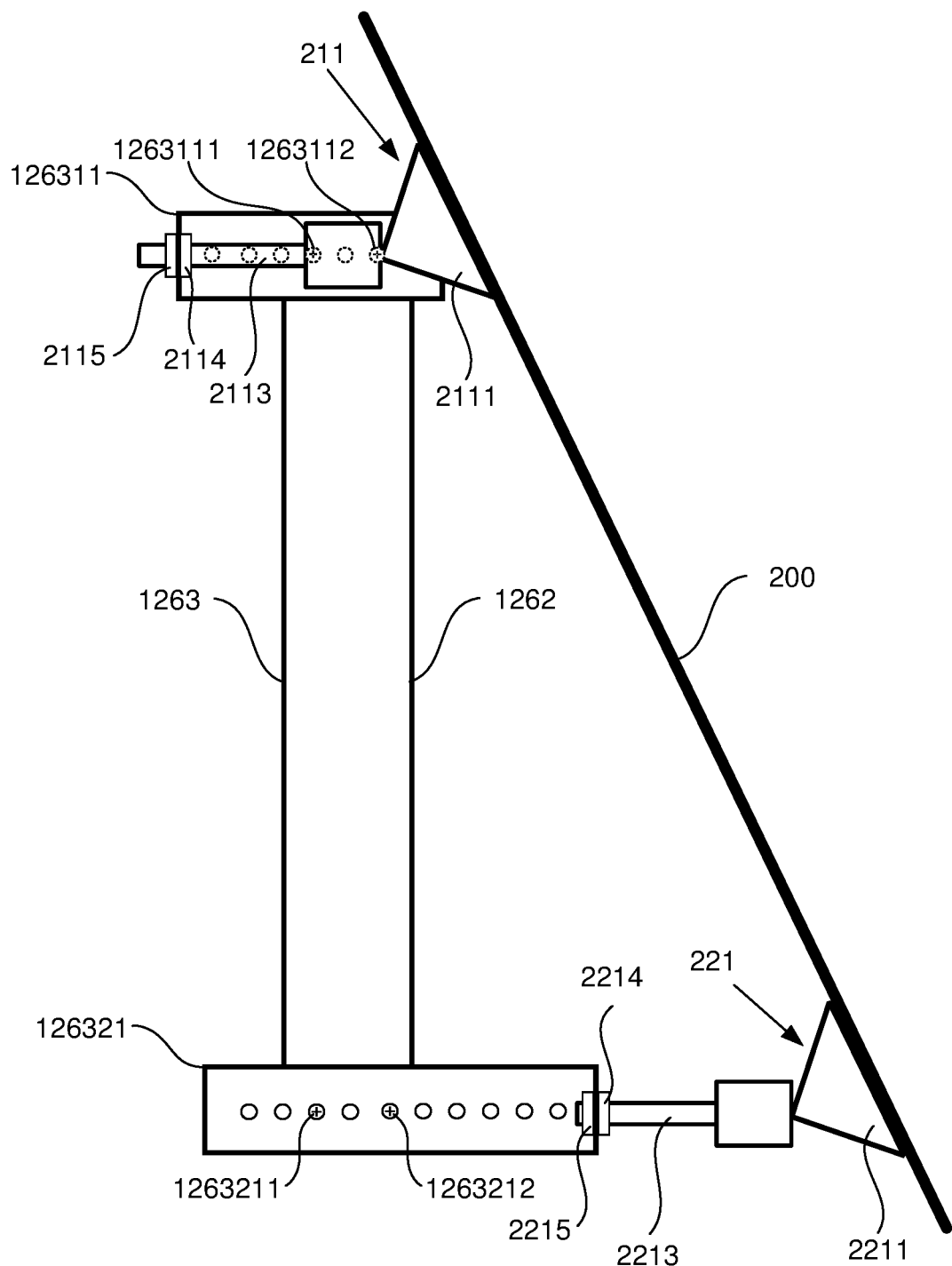
FIG. 14 illustrates a left side view of installation of the mobile advertisement system onto a back window of a vehicle using suction cups according to certain embodiments of the present disclosure.

Referring now to FIG. 14, a left side view of installation of the mobile advertisement system 120 onto the back window 200 of the vehicle using the upper left suction cup 211 and the lower left suction cup 221 is shown according to certain embodiments of the present disclosure.

First, the upper left bracket 126311 is attached to the upper left corner of the mobile advertisement system 120 through a first upper left bracket screw 1263111 and a second upper left bracket screw 1263112 through a first upper left bracket installation hole 1264111 and a second upper left bracket installation hole 1264112.

Second, the upper left suction cup 211 is attached to the short end of the upper left bracket suction cup installation hole 1263113 using a first upper left suction cup installation bolt 2114 and a second upper left suction cup installation bolt 2115 on an upper left suction cup installation screw 2113. Based on the length of the upper left suction cup installation screw 2113, the upper left bracket 126311 is adjusted that the top of the mobile advertisement system 120 is close to the back window 200 of the vehicle.

Third, the lower left bracket 126321 is attached to the lower left corner of the mobile advertisement system 120 through a first lower left bracket screw 1263211 and a second lower left bracket screw 1263212 through a first lower left bracket installation hole 1264211 and a second lower left bracket installation hole 1264212.

Fourth, the lower left suction cup 221 is attached to the short end of the lower left bracket suction cup installation hole 1263213 using a first lower left suction cup installation bolt 2214 and a second lower left suction cup installation bolt 2215 on a lower left suction cup installation screw 2213. Based on the length of the upper left suction cup installation screw 2213, the lower left bracket 126321 is adjusted that the bottom of the mobile advertisement system 120 is extended inside enough to ensure the mobile advertisement system 120 is installed vertically.

Figure 15:
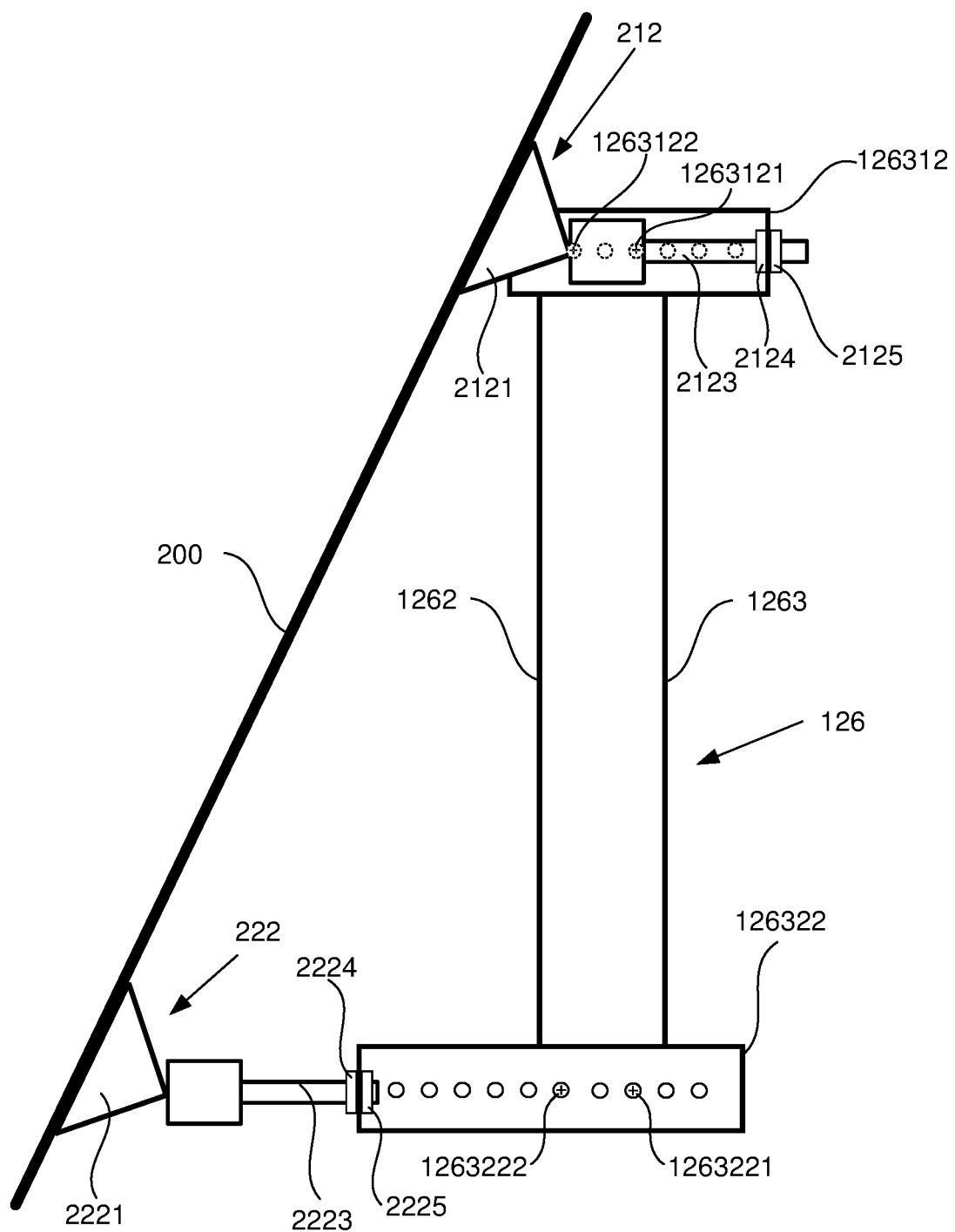
FIG. 15 illustrates a right side view of installation of the mobile advertisement system onto the back window of the vehicle using suction cups according to certain embodiments of the present disclosure.

Referring now to FIG. 15, a right side view of installation of the mobile advertisement system 120 onto the back window 200 of the vehicle using the upper right suction cup 212 and the lower right suction cup 222 is shown according to certain embodiments of the present disclosure.

Fifth, the upper right bracket 126312 is attached to the upper right corner of the mobile advertisement system 120 through a first upper right bracket screw 1263121 and a second upper right bracket screw 1263122 through a first upper right bracket installation hole 1264121 and a second upper right bracket installation hole 1264122.

Sixth, the upper right suction cup 212 is attached to the short end of the upper right bracket suction cup installation hole 1263123 using a first upper right suction cup installation bolt 2124 and a second upper right suction cup installation bolt 2125 on an upper right suction cup installation screw 2123. Based on the length of the upper right suction cup installation screw 2123, the upper right bracket 126312 is adjusted that the top of the mobile advertisement system 120 is close to the back window 200 of the vehicle.

Seventh, the lower right bracket 126322 is attached to the lower right corner of the mobile advertisement system 120 through a first lower right bracket screw 1263221 and a second lower right bracket screw 1263222 through a first lower right bracket installation hole 1264221 and a second lower right bracket installation hole 1264222.

Eighth, the lower right suction cup 222 is attached to the short end of the lower right bracket suction cup installation hole 1263223 using a first lower right suction cup installation bolt 2224 and a second lower right suction cup installation bolt 2225 on a lower right suction cup installation screw 2223. Based on the length of the upper right suction cup installation screw 2223, the lower right bracket 126322 is adjusted that the bottom of the mobile advertisement system 120 is extended inside enough to ensure the mobile advertisement system 120 is installed vertically.

Once all four brackets 126311, 126312, 126321, and 126322 are installed at each of four corners of the mobile advertisement system 120, and all four suction cups 211, 212, 221, and 222 are installed on the four brackets 126311, 126312, 126321, and 126322, the mobile advertisement system 120 is ready to attach to the back window 200 of the vehicle using an upper left suction contact 2111, an upper right suction contact 2121, a lower left suction contact 2211, a lower right suction contact 2121. Prior to attaching these four suction cups to the back window 200 of the vehicle, the mobile advertisement system 120 should be place in the center of the back window 200 and the mobile advertisement system 120 should be level horizontally.

In another aspect, as shown in FIG. 1, the present disclosure relates to a mobile advertisement platform 10. In certain embodiments, the mobile advertisement platform 10 includes: a mobile advertisement server 102, and N mobile advertisement system 120: a first mobile advertisement system 1201, a second mobile advertisement system 1202, a third mobile advertisement system 1203, . . . , and a N-th mobile advertisement system 120N, where N is a positive integer. Each of the mobile advertisement systems 120 is installed on a back window 200 of a vehicle, and each of the mobile advertisement systems 120 corresponds to at least one mobile advertisement participant, also known as a subscriber. Each of the mobile advertisement systems 120 is wirelessly connected to the mobile advertisement server 102 through a network 110.

In certain embodiments, the mobile advertisement server 102 registers a group of advertisers and a group of subscribers, receives location-based advertisements and their corresponding delivery instructions from the advertisers, receives GPS location updates in a predetermined interval from each of the group of mobile advertisement systems 120, dispatches the location-based advertisements and the corresponding delivery instructions based on the GPS location updates received to each of the group of mobile advertisement systems 120 through the network 110, and receives delivery confirmations after each location-based advertisement is displayed according to the corresponding delivery instructions through the network 110.

In certain embodiments, the network 110 may be a wireless network. The network 110 includes the internet, a wireless network, mobile communication network, Wi-Fi network, Zigbee personal area network, and Bluetooth network. The mobile advertisement server 102 manages operations of the mobile advertisement platform 10, including the operations of the N mobile advertisement systems 120.

Figure 2:
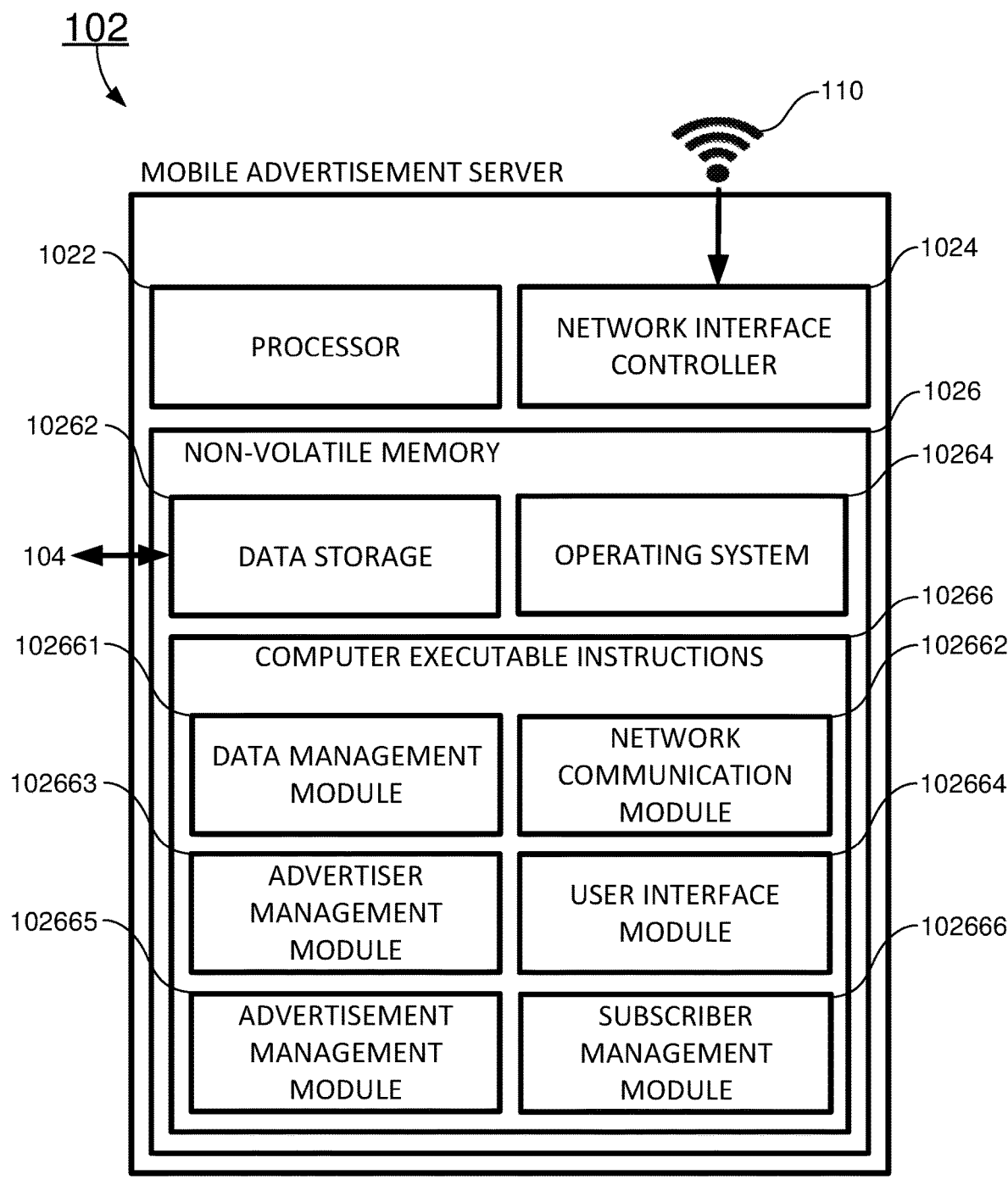
FIG. 2 shows a block diagram of a mobile advertisement server of the mobile advertisement platform according to certain embodiments of the present disclosure.

Referring now to FIG. 2, a block diagram of a mobile advertisement server 102 is shown according to certain embodiments of the present disclosure. In certain embodiments, the mobile advertisement server 102 includes a processor 1022, a network interface controller 1024, and a non-volatile memory 1026 having a data storage 10262, an operating system 10264, and computer executable instructions 10266. The network interface controller 1024 is used to establish and maintain network communication of the mobile advertisement server 102 with all mobile advertisement systems 120 connected through the network 110. The data storage 10262 stores all advertiser information, subscriber information and advertisement information locally for the mobile advertisement server 102. The computer executable instructions 10266 include: a data management module 102661, a network communication module 102662, an advertiser management module 102663, a user interface module 102664, an advertisement management module 102665, and a subscriber management module 102666.

In certain embodiments, the computer executable instructions in the user interface module 102664 and the advertiser management module 102663 allow one or more advertisers to register and store the advertiser information through the data management module 102661 to the data storage 10262 and a mobile advertisement database 104.

The computer executable instructions in the user interface module 102666 and the subscriber management module 102666 allow one or more subscribers to register and store the subscriber information through the data management module 102661 to the data storage 10262 and the mobile advertisement database 104.

The computer executable instructions in the data management module 102661 and the advertisement management module 102665 cause the processor 1022 to receive the advertisements and the delivery instructions and store advertisement information through the data management module 102661 to the data storage 10262 and the mobile advertisement database 104.

The computer executable instructions in the network communication module 102662 and the network interface controller 1024 of the mobile advertisement server 102 cause the processor 1022 to receive GPS location updates in the predetermined interval from each of the mobile advertisement system 120 and data communication between the mobile advertisement server 102 and all mobile advertisement systems 120 though a wireless communication antenna 1222 to the network 110, store the GPS location updates through the data management module 102641 to the data storage 10262 and the mobile advertisement database 104.

The computer executable instructions in the data management module 102661 and the advertisement management module 102665 cause the processor 1022 to dispatch via the network communication module 102662, the network interface controller 1024 and the network 110, the advertisements and the delivery instructions to each of the mobile advertisement systems 120 operating in the region specified by the advertisement delivery location information and during the advertisement delivery time period. In certain embodiments, each of the advertisements includes: one or more banners, one or more digital images, one or more messages in text form, one or more animations, and one or more videos. Each of the delivery instructions corresponds to one of the advertisements, and each of the delivery instructions includes: an advertisement delivery time period and an advertisement delivery location information. Each of the mobile advertisement systems 120 displays the advertisements when the mobile advertisement system 120 is positioned in a region specified by the advertisement delivery location information, during the advertisement delivery time period, and when at least one automobile behind is detected.

The computer executable instructions in the network communication module 102662 and the network interface controller 1024 cause the processor 1022 to receive via the network 110, delivery confirmations from each of the mobile advertisement systems 120 after each advertisement is displayed according to the corresponding delivery instructions.

The delivery confirmation for each of the advertisements includes: the time of display of each of the advertisements, the location of display of each of the advertisements, total time of display of each of the advertisements, and number of vehicles and observers detected behind the vehicle. In one embodiment, the delivery confirmation may be used to account for the final results of the advertisements delivered so the mobile advertisement platform 10 may use the delivery confirmation to charge the advertisers, and generate reports for the advertisers to evaluate the effectiveness of the advertisement campaign.

Figure 4:
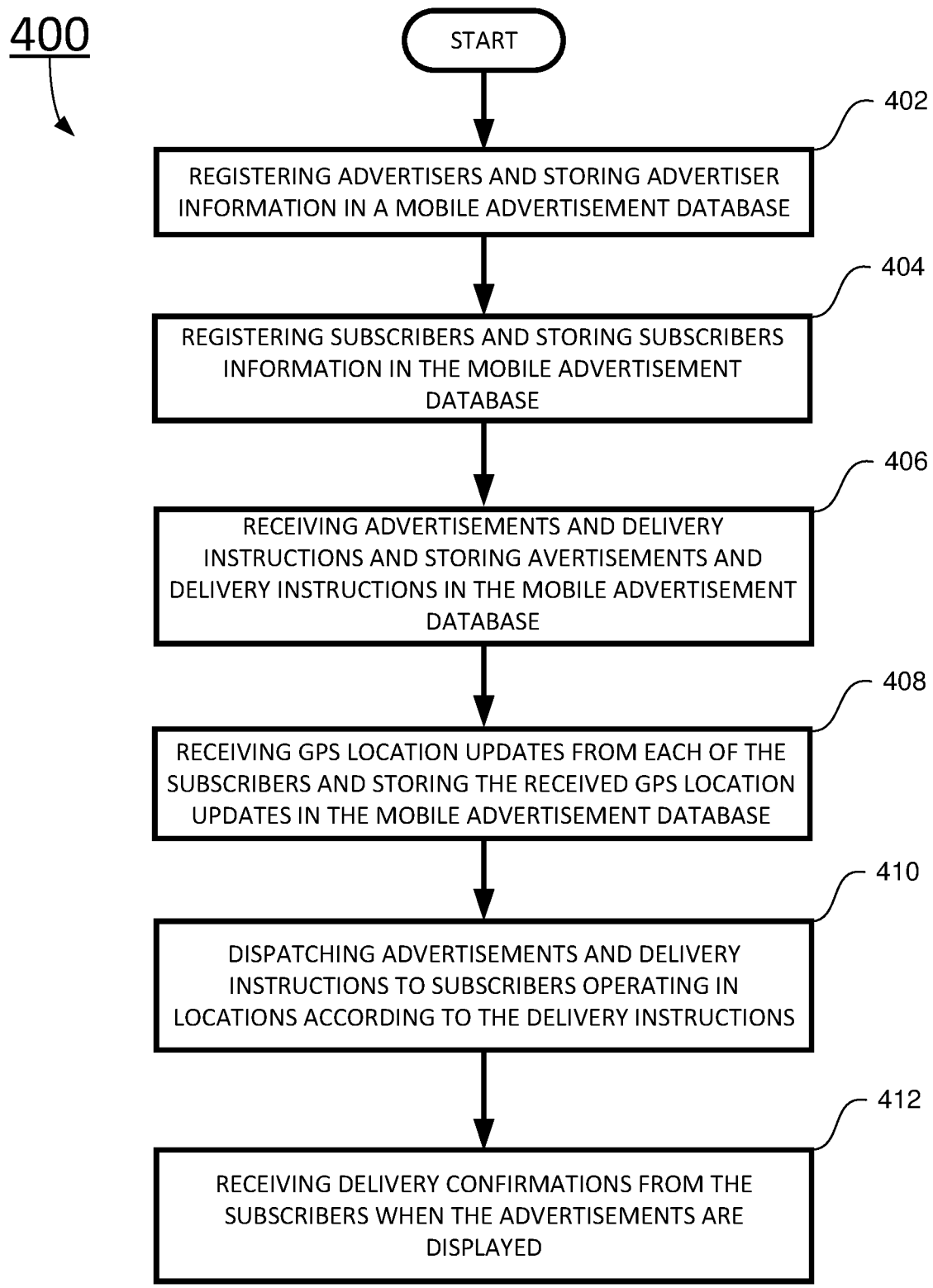
FIG. 4 shows a flow chart of a method of using the mobile advertisement server according to certain embodiments of the present disclosure.

Referring now to FIG. 4, a method 400 of using the mobile advertisement server 102 is shown according to certain embodiments of the present disclosure.

At block 402, one or more advertisers may establish network communication to the mobile advertisement server 102 using a regular computer and register each of the advertisers. Registering advertisers may include: entering, by each of the advertisers, contact information, and financial information such that the mobile advertisement platform 10 can use this information to do business with each of the advertisers. The contact information and financial information is stored in a secure mobile advertisement database 104 and a data storage 10262 of the mobile advertisement server 102.

The network interface controller 1024, the network communication module 102662, the advertiser management module 102663 and the data management module 102661 of the mobile advertisement server 102 are used for registering the advertisers. The advertisers may be added to the mobile advertisement platform 10 at any time.

At block 404, one or more mobile advertisement participants using mobile advertisement system 120, or also known as subscribers may establish network communication to the mobile advertisement server 102 using a regular computer or through the mobile advertisement system 120 and register each of the subscribers. Each of the subscribers corresponds to at least one mobile advertisement system 120.

In certain embodiments, registering subscribers may include: entering, by each of the subscribers, contact information, financial information, information of the mobile advertisement system 120 that corresponds to the subscriber, and current GPS location information for each of the subscribers such that the mobile advertisement platform 10 can use this information to dispatch advertisements and delivery instructions to each of the mobile advertisement system 120 to allow each of the subscribers to display advertisements according to the delivery instructions received, and provide compensations to each of the subscribers. The current GPS location information for each of the subscribers is updated periodically in real-time through the network 110. The contact information, financial information, the mobile advertisement system 120 information and the current GPS location information are stored in the secure mobile advertisement database 104 and the data storage 10262 of the mobile advertisement server 102.

The network interface controller 1024, the network communication module 102662, the subscriber management module 102666 and the data management module 102661 of the mobile advertisement server 102 are used for registering the subscribers. The subscribers may be added to the mobile advertisement platform 10 at any time.

At block 406, the registered advertisers may establish network communication to the mobile advertisement server 102 using a regular computer and send one or more advertisements and their corresponding delivery instructions to the mobile advertisement server 102.

In certain embodiments, each of the advertisements includes: one or more banners, one or more digital images, one or more messages in text form, one or more animations, and one or more videos. Each of the delivery instructions corresponds to one of the advertisements, and each of the delivery instructions includes: an advertisement delivery time period and an advertisement delivery location information.

The network interface controller 1024, the network communication module 102662, the advertisement management module 102665 and the data management module 102661 of the mobile advertisement server 102 are used for receiving the advertisements and the corresponding delivery instructions from each of the advertisers. The advertisements and the corresponding delivery instructions may be provided to the mobile advertisement platform 10 at any time.

At block 408, the mobile advertisement server 102 receives GPS location updates from each of the mobile advertisement systems 120 in a predetermined interval. For example, the mobile advertisement server 102 receives GPS location updates from each of the mobile advertisement systems 120 every one minute, or every five minutes. The mobile advertisement server 102 stores the GPS location updates from each of the mobile advertisement systems 120 in the secure mobile advertisement database 104 and the data storage 10262 of the mobile advertisement server 102.

In certain embodiments, the GPS location updates from each of the mobile advertisement systems 120 may be provided to the mobile advertisement server 102 at any time. In one embodiment, the mobile advertisement system 120 may send out GPS location updates when the vehicle carrying the mobile advertisement system 120 moves away from the current GPS location a predetermined distance, for example, a mile, or three miles.

The network interface controller 1024, the network communication module 102662, the subscriber management module 102666 and the data management module 102661 of the mobile advertisement server 102 are used for receiving the GPS location updates from each of the mobile advertisement system 120.

At block 410, in response to the GPS location updates received, the mobile advertisement server 102 dispatches the advertisements and the delivery instructions to the mobile advertisement system 120 sending the GPS location updates and operating in the region specified by the advertisement delivery location information and during the advertisement delivery time period.

In certain embodiments, the mobile advertisement server 102 dispatches one or more advertisements for the mobile advertisement system 120 sending the GPS location updates only when the GPS location updates indicate a location located in a predetermined distance, for example, a mile, from the current GPS location, such that the data traffic between the mobile advertisement server 102 and the mobile advertisement system 120 may be reduced.

In certain embodiments, the dispatching includes: sorting the advertisements according to a start time of the advertisement delivery time period indicated in the delivery instructions, going through each of the advertisements prior to the start time of each of the advertisements, searching for a group of mobile advertisement systems 120 currently located in the region specified by the advertisement delivery location information of the delivery instruction of the advertisement, and dispatching the advertisement to the group of mobile advertisement systems 120 currently located in the region.

In one embodiment, the mobile advertisement server 102 dispatches the advertisements and the delivery instructions to the mobile advertisement system 120 only when the mobile advertisement system 120 moves away from the current GPS location a predetermined distance, for example, a mile, or three miles. In another embodiment, the mobile advertisement server 102 dispatches the advertisements and the delivery instructions to the mobile advertisement system 120 only when the mobile advertisement server 102 receives one or more new advertisements to be delivered in or around the current GPS location.

The network interface controller 1024, the network communication module 102662, the advertisement management module 102665 and the data management module 102661 of the mobile advertisement server 102 are used for dispatching the advertisements and their corresponding delivery instructions.

At block 412, the mobile advertisement server 102 receives delivery confirmations from each of the mobile advertisement system 120 when each of the mobile advertisement system 120 displays one or more of the advertisements received by the mobile advertisement system 120.

The delivery confirmation for each of the advertisements includes: the time of display of each of the advertisements, the location of display of each of the advertisements, total time of display of each of the advertisements, and number of vehicles and observers detected behind the vehicle. In one embodiment, the delivery confirmation may be used to account for the final results of the advertisements delivered so the mobile advertisement platform 10 may use the delivery confirmation to charge the advertisers. The received delivery confirmations are stored in the secure mobile advertisement database 104 and the data storage 10262 of the mobile advertisement server 102.

The network interface controller 1024, the network communication module 102662, the subscriber management module 102666, the advertisement management module 102665 and the data management module 102661 of the mobile advertisement server 102 are used for receiving the delivery confirmations from each of the mobile advertisement system 120.

Referring now to FIG. 3, each of the mobile advertisement systems 120 is installed on a back window 200 of a vehicle. The mobile advertisement system 120 includes: a processor 121, a network interface controller 122, an USB interface 124 connected to a USB interface connector 1242, a power module 125 connected to a power supply of the vehicle, a display screen 126 having a light sensor 1261, and a non-volatile memory 123. The non-volatile memory 123 includes a local data storage 1232 and computer executable instructions 1231. In certain embodiments, the computer executable instructions 1231 includes: a GPS module 12311, a network communication module 12312, a mobile advertisement control module 12313, and a mobile advertisement control module 12313.

In certain embodiments, the GPS module 12311 receives GPS satellite signal through a GPS antenna 123111 to determine the GPS location of the mobile advertisement system 120. The network communication module 12312 communicates with a mobile advertisement server 102 through the network interface controller 122 and a wireless communication antenna 1222 over a network 110. The mobile advertisement control module 12313 is connected to a video camera 123131, the video camera 123131 is installed on top of the display screen 126 to acquires images from behind of the vehicle and determines whether there are any automobiles and observers behind the vehicle, and when there is no automobile and observer behind the vehicle, the display screen 126 of the mobile advertisement system 120 will temporarily cease operation until at least one automobile is detected. The display output module 12314 controls the operation of the advertisement output to the display screen 126.

In certain embodiments, the mobile advertisement system 120 includes the light sensor 1261. The light sensor 1261 is positioned on the display screen 126 facing outside to detect environmental light intensity outside of the vehicle. The detected environmental light intensity outside of the vehicle is transmitted to the display output module 12314. The display output module 12314 receives the detected environmental light intensity outside of the vehicle from the light sensor 1261, and controls the display brightness of the display screen 126 in directly proportional to the detected environmental light intensity outside of the vehicle.

In certain embodiments, when executed by the processor 121, the computer executable instructions 1231 cause the processor 121 to:

connect to the mobile advertisement server 102 over the network 110;

send its GPS location updates in the predetermined interval to the mobile advertisement server 102;

receive a set of location-based advertisements and delivery instructions from the mobile advertisement server 102 in response to the GPS location updates sent;

display the set of location-based advertisements on the display screen 126 of the mobile advertisement system 120 according to the corresponding delivery instructions when at least one automobile behind is detected; and transmit delivery confirmations to the mobile advertisement server 102 from the mobile advertisement system 120 after each location-based advertisement is displayed according to the corresponding delivery instructions.

In certain embodiments, the location-based advertisements include: a set of banners, a set of digital images, a set of messages in text form, a set of animations, a set of videos, and one or more amber alerts.

In certain embodiments, the delivery confirmation includes: the time of display of each of the location-based advertisements, the location of display of each of the location-based advertisements, total time of display of each of the location-based advertisements, and number of vehicles and observers detected behind the vehicle.

In certain embodiments, when executed by the processor 121, the computer executable instructions 1231 cause the processor 121 to:

retrieve a set of local advertisements and a set of local delivery instructions through the USB interface 124 when the set of local advertisements and the set of local delivery instructions are available;

store the set of local advertisements and the set of local delivery instructions retrieved in the local data storage 1232; and display the set of local advertisements through the display screen 126 according to the set of local delivery instructions when at least one automobile behind is detected.

In certain embodiments, the set of local advertisements includes: a set of banners, a set of digital images, a set of messages in text form, a set of animations, and a set of videos.

In certain embodiments, the display screen 126 of the mobile advertisement system 120 includes: a light-emitting diode (LED) display panel 1262, and an organic light-emitting diode (OLED) display panel 1262.

In certain embodiments, as shown in FIG. 6 and FIG. 7, the mobile advertisement system 120 is installed in a rectangular display screen case 1263. The rectangular display screen case 1263 includes: the video camera 123131, the light sensor 1261, the GPS antenna 123111, a wireless communication antenna 1222, and the display panel 1262. The display panel 1262 faces outside through a back window 200 of the vehicle. The video camera 123131 also faces outside of the vehicle to detect any automobiles and any observers behind the vehicle. The light sensor 1261 also faces outside to detect environmental light intensity outside of the vehicle. As shown in FIG. 6 and FIG. 7, the GPS antenna 123111 and the wireless communication antenna 1222 are placed on a top edge of the mobile advertisement system 120 to have best reception of wireless communication signals and GPS signals.

In a preferred embodiment, as shown in FIGS. 6-15, the rectangular display screen case 1263 has four corners: an upper left corner, an upper right corner, a lower left corner, and a lower right corner. In each of these four corners, there is a corresponding bracket: an upper left bracket 126311 at the upper left corner, an upper right bracket 126312 at the upper right corner, a lower left bracket 126321 at the lower left corner, and a lower right bracket 126322 at the lower right corner.

In certain embodiments, a left side view of the mobile advertisement system 120 is shown in FIG. 8. The left side of the mobile advertisement system 120 includes a first upper left bracket installation hole 1264111, a second upper left bracket installation hole 1264112 for fastening the upper left bracket 126311, a first lower left bracket installation hole 1264211, a second lower left bracket installation hole 1264212 for fastening the lower left bracket 126321. The upper left bracket 126311 includes a set of upper left bracket holes 1263114 and the lower left bracket 126321 includes a set of lower left bracket holes 1263214. The set of upper left bracket holes 1263114 allows a distance between a top of the mobile advertisement system 120 and the back window 200 of the vehicle to be adjusted. The set of lower left bracket holes 1263214 allows a distance between a bottom of the mobile advertisement system 120 and the back window 200 of the vehicle to be adjusted. The upper left bracket 126311 can be slid from the left to right against the first upper left bracket installation hole 1264111 and the second upper left bracket installation hole 1264112 to adjust the distance between the top of the mobile advertisement system 120 and the back window 200 of the vehicle. The lower left bracket 126321 can be slid from the left to right against the first lower left bracket installation hole 1264211 and the second lower left bracket installation hole 1264212 to adjust the distance between the bottom of the mobile advertisement system 120 and the back window 200 of the vehicle.

In certain embodiments, a right side view of the mobile advertisement system 120 is shown in FIG. 9. The right side of the mobile advertisement system 120 includes a first upper right bracket installation hole 1264121, a second upper right bracket installation hole 1264122 for fastening the upper right bracket 126312, a first lower right bracket installation hole 1264221, a second lower right bracket installation hole 1264222 for fastening the lower right bracket 126322. The upper right bracket 126312 includes a set of upper right bracket holes 1263124 and the lower right bracket 126322 includes a set of lower right bracket holes 1263224. The set of upper right bracket holes 1263124 allows a distance between the top of the mobile advertisement system 120 and the back window 200 of the vehicle to be adjusted. The set of lower right bracket holes 1263214 allows a distance between the bottom of the mobile advertisement system 120 and the back window 200 of the vehicle to be adjusted. The upper right bracket 126312 can be slid from the left to right against the first upper right bracket installation hole 1264121 and the second upper right bracket installation hole 1264122 to adjust the distance between the top of the mobile advertisement system 120 and the back window 200 of the vehicle. The lower right bracket 126322 can be slid from the left to right against the first lower right bracket installation hole 1264221 and the second lower right bracket installation hole 1264222 to adjust the distance between the bottom of the mobile advertisement system 120 and the back window 200 of the vehicle.

It is well known that back windows of different vehicle have different slopes. Some of them, such as van and some SUV, are straight up and down. Others shows various angles such as sedans and some sports cars. In order to be able to install in many different vehicles, flexibility of adjustment of the distance between the top end and bottom end of the mobile advertisement system 120 is necessary. Such a flexibility ensures the mobile advertisement system 120 is installed vertically regardless the slop of the back window 200 so that anyone from outside of the vehicle will see the display screen 126 without distortion.

Referring now to FIG. 10, a front view, a side view and a top sectional view of the upper left bracket 126311 are shown according to certain embodiments of the present disclosure. The upper left bracket 126311 forms an "L" shape. The shorter end of the "L" includes an upper left bracket suction cup installation hole 1263113 for install an upper left suction cup 211. The longer end of the "L" includes the set of upper left bracket holes 1263114 for fastening the upper left bracket 126311 onto the upper left corner of the mobile advertisement system 120.

Referring now to FIG. 11, a top sectional view, a front view, and a side view of the upper right bracket 126312 are shown according to certain embodiments of the present disclosure. The upper right bracket 126312 forms an "L" shape. The shorter end of the "L" includes an upper right bracket suction cup installation hole 1263123 for install an upper right suction cup 212. The longer end of the "L" includes the set of upper right bracket holes 1263124 for fastening the upper right bracket 126312 onto the upper right corner of the mobile advertisement system 120.

Referring now to FIG. 12, a front view, a side view and a top sectional view of the lower left bracket 126321 are shown according to certain embodiments of the present disclosure. The lower left bracket 126321 forms an "L" shape. The shorter end of the "L" includes a lower left bracket suction cup installation hole 1263213 for install a lower left suction cup 221. The longer end of the "L" includes the set of lower left bracket holes 1263214 for fastening the lower left bracket 126321 onto the lower left corner of the mobile advertisement system 120.

Referring now to FIG. 13, a top sectional view, a front view, and a side view of the lower right bracket 126322 according to certain embodiments of the present disclosure. The lower right bracket 126322 forms an "L" shape. The shorter end of the "L" includes a lower right bracket suction cup installation hole 1263223 for install a lower right suction cup 222. The longer end of the "L" includes the set of lower right bracket holes 1263224 for fastening the lower right bracket 126322 onto the lower right corner of the mobile advertisement system 120.

Referring now to FIG. 14, a left side view of installation of the mobile advertisement system 120 onto the back window 200 of the vehicle using the upper left suction cup 211 and the lower left suction cup 221 is shown according to certain embodiments of the present disclosure.

First, the upper left bracket 126311 is attached to the upper left corner of the mobile advertisement system 120 through a first upper left bracket screw 1263111 and a second upper left bracket screw 1263112 through a first upper left bracket installation hole 1264111 and a second upper left bracket installation hole 1264112.

Second, the upper left suction cup 211 is attached to the short end of the upper left bracket suction cup installation hole 1263113 using a first upper left suction cup installation bolt 2114 and a second upper left suction cup installation bolt 2115 on an upper left suction cup installation screw 2113. Based on the length of the upper left suction cup installation screw 2113, the upper left bracket 126311 is adjusted that the top of the mobile advertisement system 120 is close to the back window 200 of the vehicle.

Third, the lower left bracket 126321 is attached to the lower left corner of the mobile advertisement system 120 through a first lower left bracket screw 1263211 and a second lower left bracket screw 1263212 through a first lower left bracket installation hole 1264211 and a second lower left bracket installation hole 1264212.

Fourth, the lower left suction cup 221 is attached to the short end of the lower left bracket suction cup installation hole 1263213 using a first lower left suction cup installation bolt 2214 and a second lower left suction cup installation bolt 2215 on a lower left suction cup installation screw 2213. Based on the length of the upper left suction cup installation screw 2213, the lower left bracket 126321 is adjusted that the bottom of the mobile advertisement system 120 is extended inside enough to ensure the mobile advertisement system 120 is installed vertically.

Referring now to FIG. 15, a right side view of installation of the mobile advertisement system 120 onto the back window 200 of the vehicle using the upper right suction cup 212 and the lower right suction cup 222 is shown according to certain embodiments of the present disclosure.

Fifth, the upper right bracket 126312 is attached to the upper right corner of the mobile advertisement system 120 through a first upper right bracket screw 1263121 and a second upper right bracket screw 1263122 through a first upper right bracket installation hole 1264121 and a second upper right bracket installation hole 1264122.

Sixth, the upper right suction cup 212 is attached to the short end of the upper right bracket suction cup installation hole 1263123 using a first upper right suction cup installation bolt 2124 and a second upper right suction cup installation bolt 2125 on an upper right suction cup installation screw 2123. Based on the length of the upper right suction cup installation screw 2123, the upper right bracket 126312 is adjusted that the top of the mobile advertisement system 120 is close to the back window 200 of the vehicle.

Seventh, the lower right bracket 126322 is attached to the lower right corner of the mobile advertisement system 120 through a first lower right bracket screw 1263221 and a second lower right bracket screw 1263222 through a first lower right bracket installation hole 1264221 and a second lower right bracket installation hole 1264222.

Eighth, the lower right suction cup 222 is attached to the short end of the lower right bracket suction cup installation hole 1263223 using a first lower right suction cup installation bolt 2224 and a second lower right suction cup installation bolt 2225 on a lower right suction cup installation screw 2223. Based on the length of the upper right suction cup installation screw 2223, the lower right bracket 126322 is adjusted that the bottom of the mobile advertisement system 120 is extended inside enough to ensure the mobile advertisement system 120 is installed vertically.

Once all four brackets 126311, 126312, 126321, and 126322 are installed at each of four corners of the mobile advertisement system 120, and all four suction cups 211, 212, 221, and 222 are installed on the four brackets 126311, 126312, 126321, and 126322, the mobile advertisement system 120 is ready to attach to the back window 200 of the vehicle using an upper left suction contact 2111, an upper right suction contact 2121, a lower left suction contact 2211, a lower right suction contact 2121. Prior to attaching these four suction cups to the back window 200 of the vehicle, the mobile advertisement system 120 should be place in the center of the back window 200 and the mobile advertisement system 120 should be level horizontally.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to activate others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims, the foregoing description and the exemplary embodiments described therein, and accompanying drawings.

What is claimed is:

1. A mobile advertisement system installed on a back window of a vehicle, comprising:
    a processor, a network interface controller, an USB interface connected to an USB interface connector, a power module connected to a power supply of the vehicle, a display screen having a light sensor, and a non-volatile memory having a local data storage and computer executable instructions, wherein the computer executable instructions comprise:
    a GPS module, wherein the GPS module receives GPS satellite signal through a GPS antenna to determine the GPS location of the mobile advertisement system;
    a network communication module, wherein the network communication module communicates with a mobile advertisement server through the network interface controller and a wireless communication antenna over a network;
    a mobile advertisement control module, wherein the mobile advertisement control module is connected to a video camera, the video camera is installed on top of the display screen to acquires images from behind of the vehicle and determines whether there are any automobiles and observers behind the vehicle, and when there is no automobile and observer behind the vehicle, the display screen of the mobile advertisement system will temporarily cease operation until at least one automobile is detected;
    a display output module, wherein the display output module controls the operation of the advertisement output to the display screen; and
    wherein the mobile advertisement system is installed in a rectangular display screen case, the rectangular display screen case comprises: the video camera; the light sensor; the GPS antenna; the wireless communication antenna; and the display panel, and the rectangular display screen case is mounted on the back window of the vehicle using four suction cups through four brackets positioned at four corners of the rectangular display screen case.

2. The mobile advertisement system of claim 1, wherein the mobile advertisement system comprises the light sensor positioned on the display screen facing outside to detect environmental light intensity outside of the vehicle, and the display output module receives detected environmental light intensity outside of the vehicle from the light sensor, and controls the display brightness of the display screen in directly proportional to the detected environmental light intensity outside of the vehicle.

3. The mobile advertisement system of claim 1, wherein when executed by the processor, the computer executable instructions cause the processor to:
    connect to the mobile advertisement server over the network;

send its GPS location updates in the predetermined interval to the mobile advertisement server;
receive a plurality of location-based advertisements and delivery instructions from the mobile advertisement server in response to the GPS location updates sent;
display the plurality of location-based advertisements on the display screen of the mobile advertisement system according to the corresponding delivery instructions when at least one automobile is detected; and
transmit delivery confirmations to the mobile advertisement server from the mobile advertisement system after each location-based advertisement is displayed according to the corresponding delivery instructions.

4. The mobile advertisement system of claim 1, wherein the display screen of the mobile advertisement system comprises:
a light-emitting diode (LED) display panel; and
an organic light-emitting diode (OLED) display panel.

5. The mobile advertisement system of claim 1, wherein each of the four brackets is fastened onto the four corners of the rectangular display screen case using two bracket screws through four sets of installation holes, and the four sets of installation holes ensure the rectangular display screen case is installed vertically regardless the slope of the back window of the vehicle.

6. A mobile advertisement platform, comprising:
a mobile advertisement server, wherein the mobile advertisement server registers a plurality of advertisers and a plurality of subscribers, receives a plurality of location-based advertisements and their corresponding delivery instructions from the advertisers, receives GPS location updates in a predetermined interval from each of a plurality of mobile advertisement systems, dispatches the plurality of location-based advertisements and the corresponding delivery instructions based on the GPS location updates received to each of the plurality of mobile advertisement systems through a network, and receives delivery confirmations after each location-based advertisement is displayed according to the corresponding delivery instructions through the network, and
a plurality of mobile advertisement systems, wherein each of the plurality of mobile advertisement systems is installed on a back window of a corresponding vehicle, connects to the mobile advertisement server over the network, sends its GPS location updates in the predetermined interval to the mobile advertisement server, receives the plurality of location-based advertisements and the delivery instructions from the mobile advertisement server in response to the GPS location updates sent, displays the plurality of location-based advertisements on a respective display screen of the mobile advertisement system according to the corresponding delivery instructions when at least one automobile behind is detected, transmits the delivery confirmations to the mobile advertisement server from each of the mobile advertisement systems after each location-based advertisement is displayed according to the corresponding delivery instructions,
wherein each of the plurality of mobile advertisement systems is installed in a rectangular display screen case, and the rectangular display screen case comprises: the video camera; the light sensor; the GPS antenna; the wireless communication antenna; and the display panel, and the rectangular display screen case is mounted on the back window of the vehicle using four suction cups through four brackets positioned at four corners of the rectangular display screen case.

7. The mobile advertisement platform of claim 6, wherein the plurality of location-based advertisements comprises:
a plurality of banners;
a plurality of digital images;
a plurality of messages in text form;
a plurality of animations;
a plurality of videos; and
one or more amber alerts.

8. The mobile advertisement platform of claim 6, wherein the delivery confirmation includes: the time of display of each of the plurality of location-based advertisements, the location of display of each of the plurality of location-based advertisements, total time of display of each of the plurality of location-based advertisements, and number of vehicles and observers detected behind the vehicle.

9. The mobile advertisement platform of claim 6, wherein each of the plurality of mobile advertisement systems comprises:
a processor, a network interface controller, an USB interface connected to an USB interface connector, a power module connected to a power supply of the vehicle, the display screen having a light sensor, and a non-volatile memory having a local data storage and computer executable instructions, wherein the computer executable instructions comprise:
a GPS module, wherein the GPS module receives GPS satellite signal through a GPS antenna to determine the GPS location of the mobile advertisement system;
a network communication module, wherein the network communication module communicates with the mobile advertisement server through the network interface controller and a wireless communication antenna over the network;
a mobile advertisement control module, wherein the mobile advertisement control module is connected to a video camera, the video camera is installed on top of the display screen to acquires images from behind of the vehicle carrying the mobile advertisement system and determines whether there are any automobiles and observers behind the vehicle, and when there is no automobile and observer behind the vehicle, the display screen of the mobile advertisement system will temporarily cease operation until at least one automobile is detected; and
a display output module, wherein the display output module controls the operation of the advertisement output to the display screen.

10. The mobile advertisement platform of claim 9, wherein each of the mobile advertisement systems comprises the light sensor positioned on the display screen facing outside to detect environmental light intensity outside of the vehicle, and the display output module receives detected environmental light intensity outside of the vehicle from the light sensor, and controls the display brightness of the display screen in directly proportional to the detected environmental light intensity outside of the vehicle.

11. The mobile advertisement platform of claim 9, wherein when executed by the processor, the computer executable instructions cause the processor to:
retrieve a plurality of local advertisements and a plurality of local delivery instructions through the USB interface when the plurality of local advertisements and the plurality of local delivery instructions are available;

store the plurality of local advertisements and the plurality of local delivery instructions retrieved in the local data storage; and display the plurality of local advertisements through the display screen according to the plurality of local delivery instructions when at least one automobile behind is detected.

12. The mobile advertisement platform of claim 11, wherein the plurality of local advertisements comprises:
   a plurality of banners;
   a plurality of digital images;
   a plurality of messages in text form;
   a plurality of animations; and
   a plurality of videos.

13. The mobile advertisement platform of claim 6, wherein the display screen of the mobile advertisement system comprises:
   a light-emitting diode (LED) display panel; and
   an organic light-emitting diode (OLED) display panel.

14. The mobile advertisement platform of claim 6, wherein each of the four brackets is fastened onto the four corners of the rectangular display screen case using two bracket screws through four sets of installation holes, and the four sets of installation holes ensure the rectangular display screen case is installed vertically regardless the slope of the back window of the vehicle.

* * * * *